US012798652B2

(12) United States Patent
Zhu et al.

(10) Patent No.: US 12,798,652 B2
(45) Date of Patent: Nov. 17, 2026

(54) CHILD STROLLER APPARATUS

(71) Applicant: Wonderland Switzerland AG, Steinhausen (CH)

(72) Inventors: Wanquan Zhu, Dongguan (CN); Haibo Zeng, Dongguan (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 276 days.

(21) Appl. No.: 18/833,768

(22) PCT Filed: Jan. 19, 2023

(86) PCT No.: PCT/EP2023/051255
§ 371 (c)(1),
(2) Date: Jul. 26, 2024

(87) PCT Pub. No.: WO2023/144006
PCT Pub. Date: Aug. 3, 2023

(65) Prior Publication Data

US 2025/0256753 A1 Aug. 14, 2025

(30) Foreign Application Priority Data

Jan. 27, 2022 (CN) ......................... 202210101200.0
May 6, 2022 (CN) ......................... 202210486837.6
Jun. 6, 2022 (CN) ......................... 202210632422.5

(51) Int. Cl.
*B62B 7/06* (2006.01)

(52) U.S. Cl.
CPC .......... *B62B 7/068* (2013.01); *B62B 2205/24* (2013.01)

(58) Field of Classification Search
CPC . B62B 7/068; B62B 2205/24; B62B 2205/20; B62B 7/062; B62B 9/00
See application file for complete search history.

(56) References Cited

U.S. PATENT DOCUMENTS 4,428,598 A * 1/1984 Kassai ...................... B62B 7/08 280/42
6,105,998 A * 8/2000 Baechler ................. B62B 7/062 280/47.38

(Continued)

FOREIGN PATENT DOCUMENTS

CN 108068869 B 4/2020
CN 112623012 A 4/2021

(Continued)

OTHER PUBLICATIONS

TW 1st Office Action with English Translation; Application No. 113131253; Mailing Date: May 9, 2025; pp. 1-11.

(Continued)

*Primary Examiner* — Jason D Shanske
*Assistant Examiner* — Caitlin Anne Miller
(74) *Attorney, Agent, or Firm* — CANTOR COLBURN LLP

(57) ABSTRACT

A child stroller apparatus includes a first leg frame having a first side segment, a second leg frame having a second side segment, a handle frame having a third side segment, a seat assembly coupled to the first side segment, and a linkage including a support bar, a slider and a frame link. The third side segment is respectively connected pivotally to the first side segment and the second side segment, wherein the third side segment is pivotally connected to the first side segment via an articulation. The support bar is respectively connected pivotally to the first side segment and the second side segment, the slider is coupled to the seat assembly and is slidably connected to the support bar, and the frame link is pivotally connected to the slider, the slider sliding along the support bar during folding and unfolding of the child stroller apparatus.

20 Claims, 41 Drawing Sheets

(56) References Cited

U.S. PATENT DOCUMENTS

| | | | | |
|---|---|---|---|---|
| 8,585,063 | B2 * | 11/2013 | Chen | B62B 7/08 280/47.38 |
| 10,479,391 | B2 * | 11/2019 | Haut | B62B 7/10 |
| 11,173,940 | B2 * | 11/2021 | Ruggiero | B62B 9/245 |
| 12,415,560 | B2 * | 9/2025 | Williams | B62B 7/004 |
| 12,559,155 | B2 * | 2/2026 | Hu | B62B 7/062 |
| 2023/0415805 | A1 * | 12/2023 | Yang | B62B 9/12 |

FOREIGN PATENT DOCUMENTS

| | | | | |
|---|---|---|---|---|
| CN | 109515508 | B | 9/2021 | |
| DE | 9400177 | U1 | 4/1994 | |
| GB | 2515557 | A | 12/2014 | |
| JP | S5374857 | U | 6/1978 | |
| JP | S5820558 | A | 2/1983 | |
| TW | 201331078 | A | 8/2013 | |
| WO | WO-2021069177 | A1 * | 4/2021 | B62B 7/06 |

OTHER PUBLICATIONS

JP Search Report with English Translation; JP App No. 2024-544755; Date Mailed: Aug. 21, 2025; pp. 1-26.

International Search Report & Written Opinion for International Application No. PCT/EP2023/051255; International Filing Date: Jan. 19, 2023; Date of Mailing: May 9, 2023; 11 pages.

* cited by examiner

100

100

100

134

100

100

100

100

100

CHILD STROLLER APPARATUS

CROSS-REFERENCE TO RELATED APPLICATION(S)

This application is a national stage application of PCT/EP2023/051255, filed Jan. 19, 2023, which claims priority to China patent application no. 202210101200.0 filed on Jan. 27, 2022, to China patent application no. 202210486837.6 filed on May 6, 2022, and to China patent application no. 202210632422.5 filed on Jun. 6, 2022, All of which are incorporated herein by reference in their entirety.

BACKGROUND

1. Field of the Invention

The present invention relates to child stroller apparatuses.

2. Description of the Related Art

Child strollers are commonly used for transporting young children. A child stroller generally includes a metallic frame made from the assembly of metallic and plastic components, and a fabric material that is connected to or covers the metallic frame. When it is not used, the child stroller can be folded for convenient storage or transport. Existing child strollers may have various types of frame constructions that allow folding and unfolding operations. From a caregiver's perspective, an important factor of consideration is the ability to conveniently fold and unfold the child stroller during use.

SUMMARY

The present application describes a child stroller apparatus that can be folded and unfolded in a smooth and convenient way.

According to an embodiment, the child stroller apparatus includes a first leg frame having a first side segment, a second leg frame having a second side segment, a handle frame having a third side segment, a seat assembly coupled to the first side segment, and a linkage including a support bar, a slider and a frame link. The third side segment is respectively connected pivotally to the first side segment and the second side segment, wherein the third side segment is pivotally connected to the first side segment via an articulation. The support bar is respectively connected pivotally to the first side segment and the second side segment, the slider is coupled to the seat assembly and is slidably connected to the support bar, and the frame link is pivotally connected to the slider, the slider sliding along the support bar during folding and unfolding of the child stroller apparatus.

DETAILED DESCRIPTION OF THE EMBODIMENTS

Figure 1:
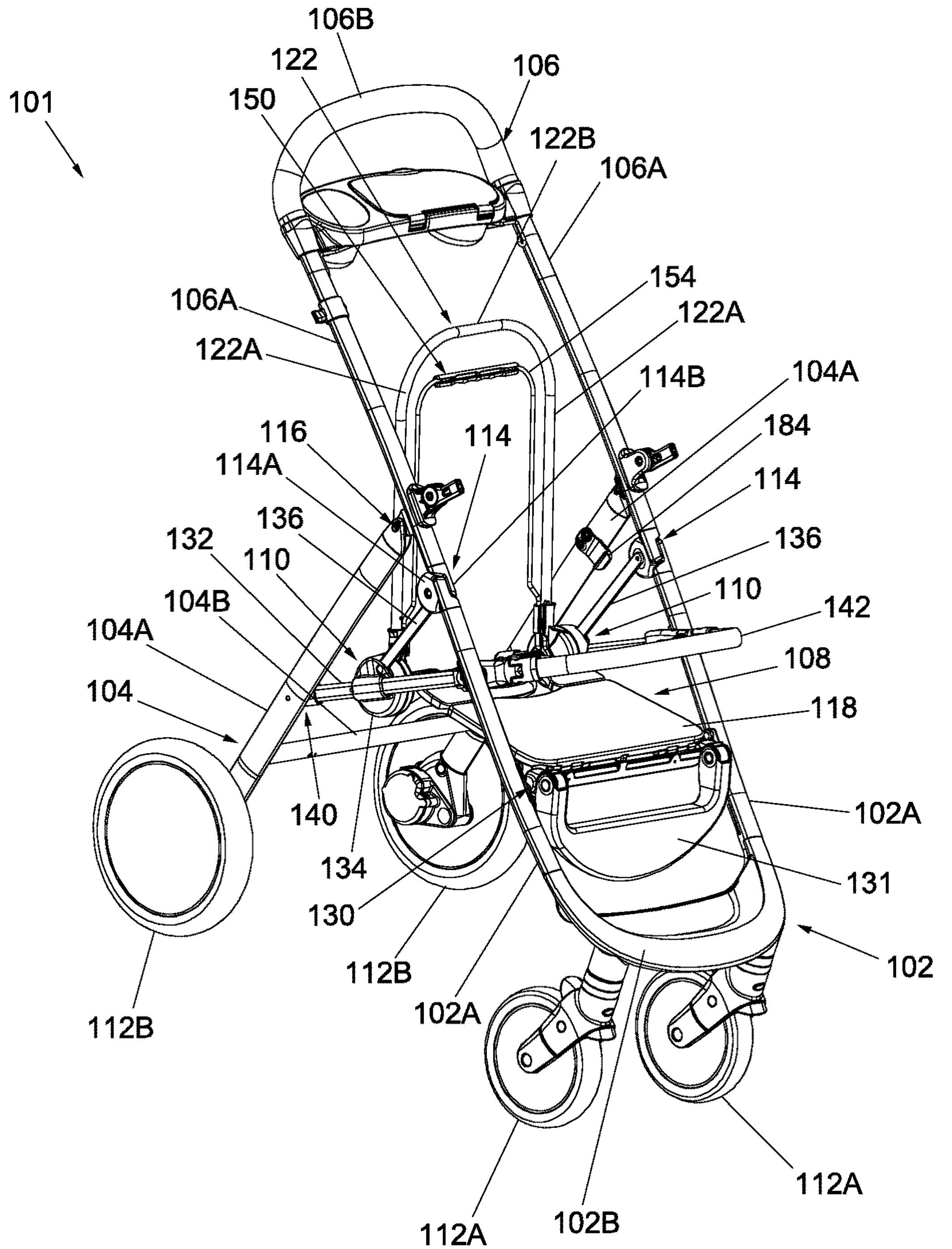
FIG. 1 is a perspective view illustrating an embodiment of a child stroller apparatus.

Various embodiments of a child stroller apparatus will be described hereinafter with reference to the accompanying drawings, wherein the same reference numbers used in the drawings will refer to the same or similar elements.

Figure 2:
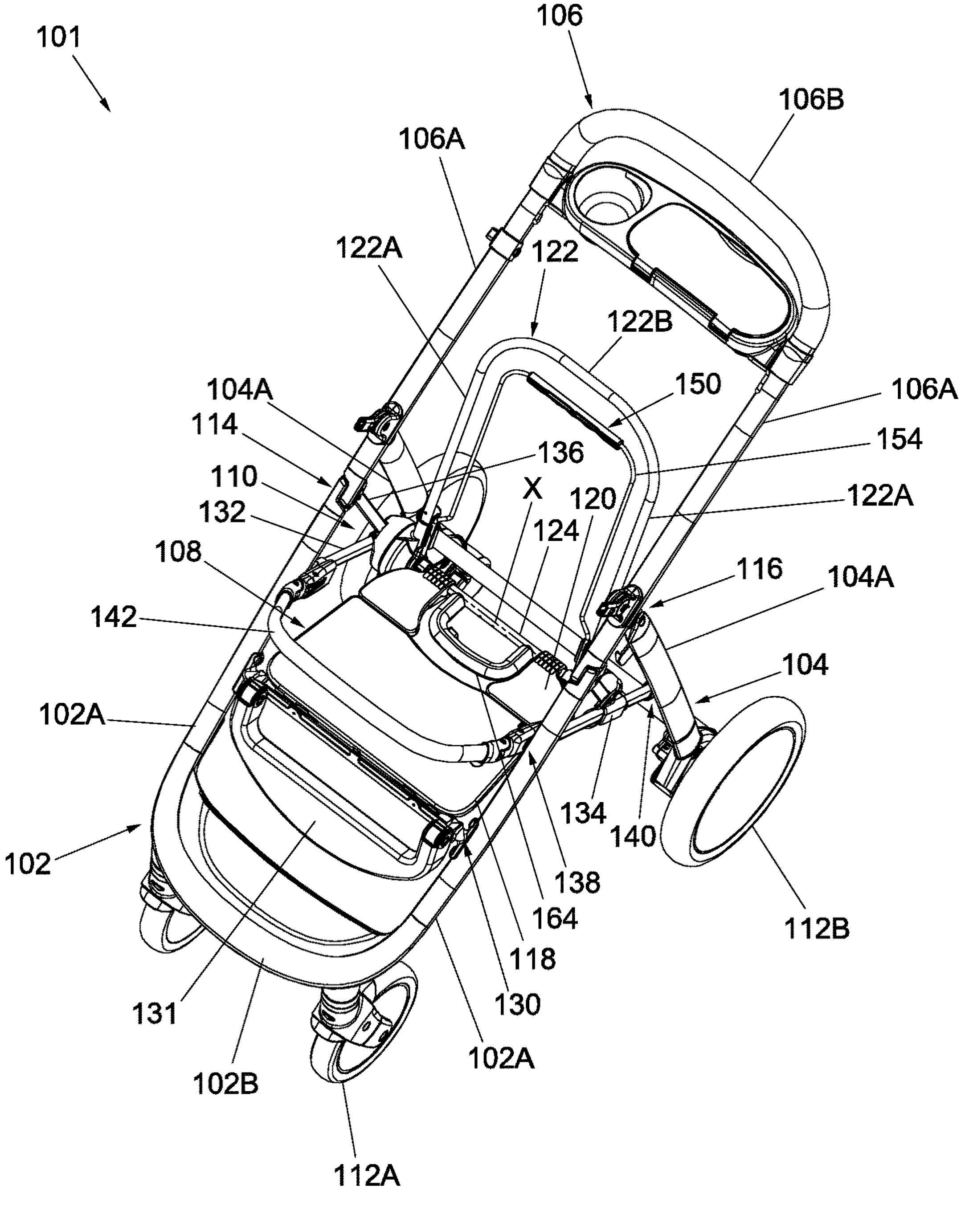
FIG. 2 is a perspective view illustrating the child stroller apparatus of FIG. 1 under a different angle of view.
Figure 3:
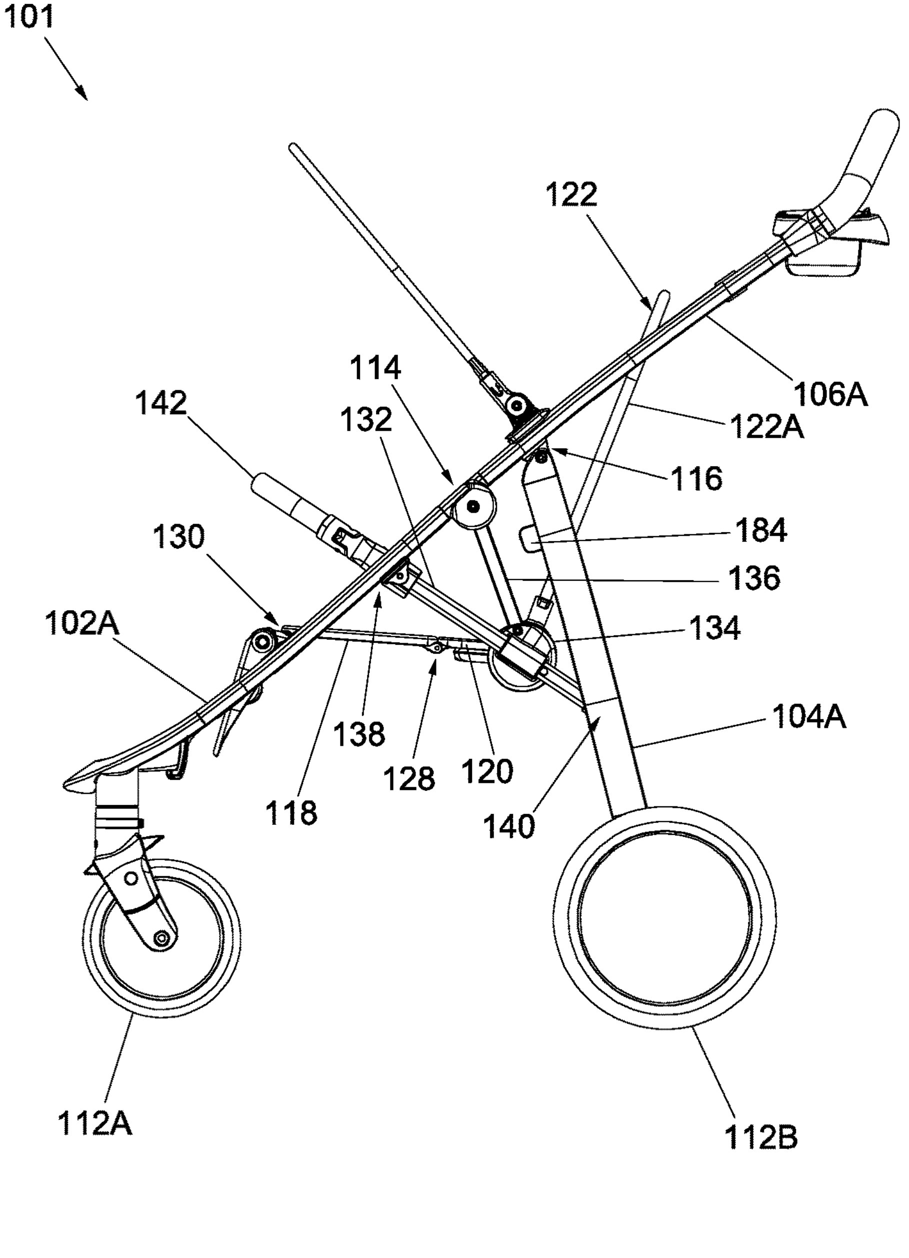
FIG. 3 is a side view of the child stroller apparatus shown in FIG. 1.
Figure 4:
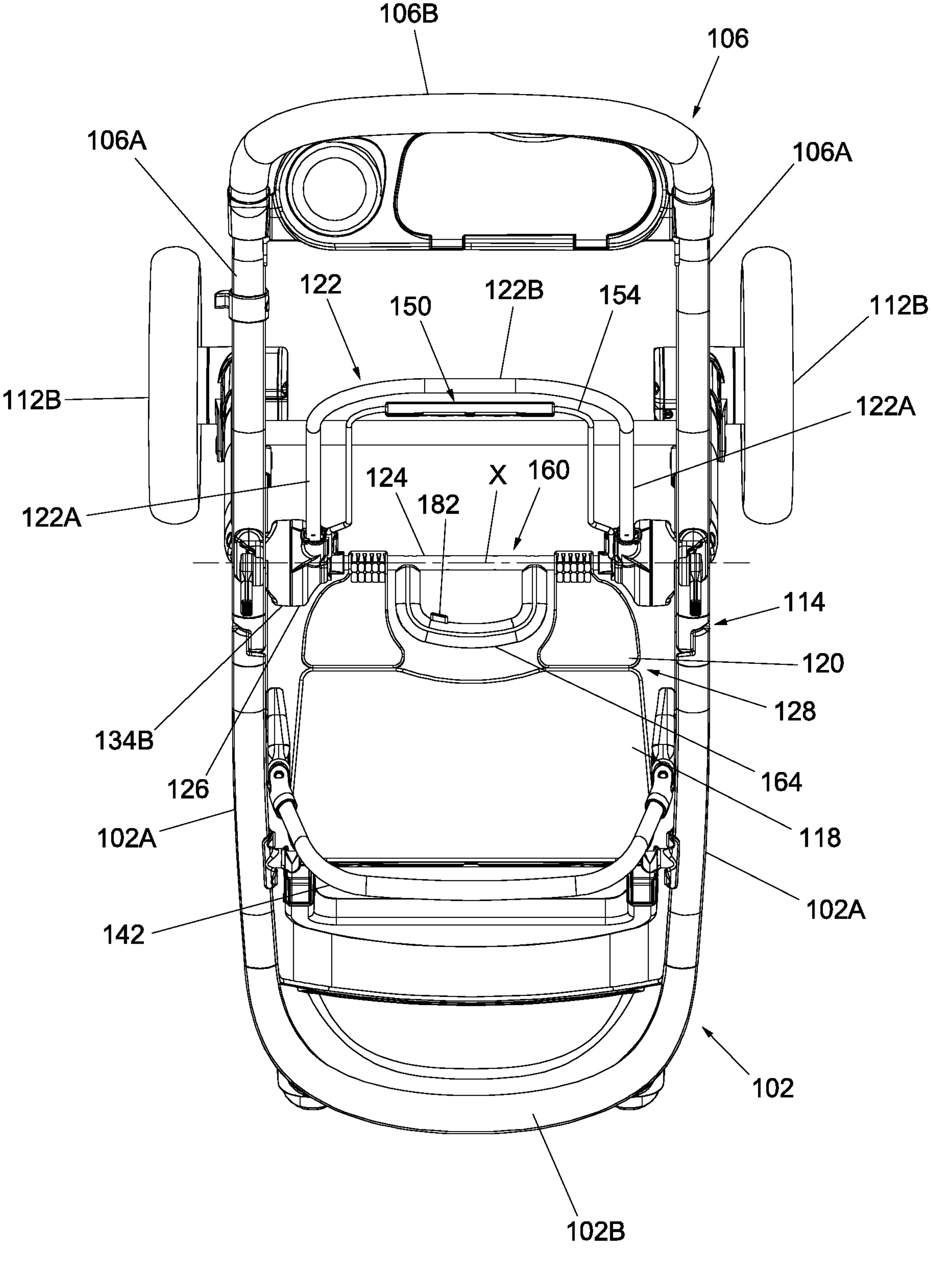
FIG. 4 is a top view of the child stroller apparatus shown in FIG. 1.
Figure 5:
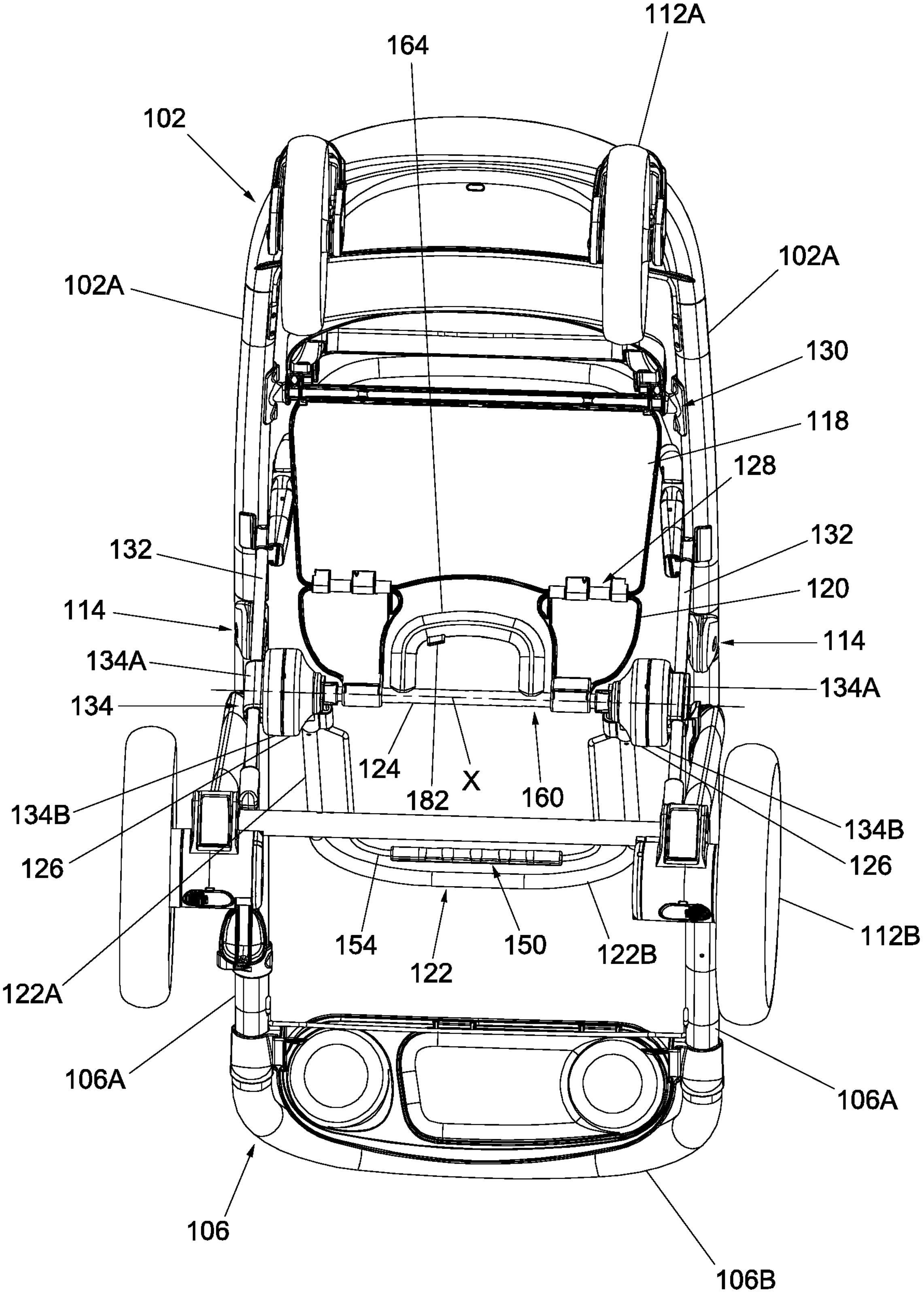
FIG. 5 is a bottom view of the child stroller apparatus shown in FIG. 1.

FIGS. 1 and 2 are perspective views illustrating an embodiment of a child stroller apparatus 100 under different angles of view. FIG. 3 is a side view of the child stroller apparatus 100. FIG. 4 is a top view of the child stroller apparatus 100. FIG. 5 is a bottom view of the child stroller apparatus 100. Referring to FIGS. 1-5, the child stroller apparatus 100 has a stroller frame 101, which can include two leg frames 102 and 104, a handle frame 106, a seat assembly 108 and two linkages 110.

The leg frame 102 is exemplarily a front leg frame, and can be formed by a plurality of tubular segments. The leg frame 102 can include two side segments 102A respectively disposed at a left and a right side of the child stroller apparatus 100, and a transversal portion 102B connected to the two side segments 102A. A lower portion of the leg frame 102 can be provided with a plurality of wheels 112A.

The leg frame 104 is exemplarily a rear leg frame, and can be formed by a plurality of tubular segments. The leg frame 104 can include two side segments 104A respectively disposed at a left and a right side of the child stroller apparatus 100, and a transversal portion 104B connected to the two side segments 104A. A lower portion of the leg frame 104 can be provided with a plurality of wheels 112B.

The handle frame 106 can also be formed by a plurality of tubular segments. The handle frame 106 can include two side segments 106A respectively disposed at a left and a right side of the child stroller apparatus 100, and a transversal segment 106B connected to the two side segments 106A.

Two same and symmetrical assembly structures can be respectively provided at the left and right side of the child stroller apparatus 100 for connecting the two leg frames 102 and 104 and the handle frame 106. According to an embodiment, the leg frame 102 and the handle frame 106 are pivotally connected to each other via two articulations 114 respectively disposed at the left and right side thereof, whereby the handle frame 106 is rotatable relative to the leg frame 102. Each articulation 114 can include, e.g., an articulation portion 114A fixedly connected to a corresponding one of the two side segments 102A of the leg frame 102 at an upper end thereof, and an articulation portion 114B fixedly connected to a corresponding one of the two side segments 106A of the handle frame 106 at a lower end thereof, the two articulation portions 114A and 114B being pivotally connected to each other so that the side segment 106A of the handle frame 106 is pivotally connected to the side segment 102A of the leg frame 102 via the articulation 114. Moreover, the leg frame 104 and the handle frame 106 are pivotally connected to each other so that the handle frame 106 is rotatable relative to the leg frame 104. For example, an upper end of the side segment 104A of the leg frame 104 can be pivotally connected to the side segment 106A of the handle frame 106 via an articulation 116. The articulations 114 and 116 that respectively connect the handle frame 106 to the leg frames 102 and 104 can be spaced apart from each other. The articulations 116 can be higher than the articulations 114 in elevation when the child stroller apparatus 100 is in an unfolded state.

Referring to FIGS. 1-5, the seat assembly 108 can be coupled to the side segments 102A of the leg frame 102 and the two linkages 110. According to an embodiment, the seat assembly 108 can include two seat portions 118 and 120 and a backrest frame 122. The seat portions 118 and 120 are connected to each other, and are adapted to provide seating support for a child. The seat portions 118 and 120 can include, without limitation, rigid seat pans. The backrest frame 122 is pivotally connected to the seat portion 120 about an axis X, and is adapted to provide support for a child's back. According to an example of construction, the backrest frame 122 can include two side segments 122A respectively disposed at a left and a right side of the seat assembly 108, and a transversal portion 122B connected to the two side segments 122A. The backrest frame 122 can include, without limitation, a plurality of tubular segments. According to an embodiment, the seat portion 120 can be pivotally connected to the side segments 122A of the backrest frame 122 via a shaft 124, wherein each of the side segments 122A can be fixedly connected to a pivot coupling portion 126, and the shaft 124 can be connected to the seat portion 120 and extend transversally along the axis X through each pivot coupling portion 126 so that the backrest frame 122 and the pivot coupling portions 126 are rotatable around the shaft 124. Accordingly, the backrest frame 122 is rotatable about the axis X relative to the seat portions 118 and 120 for adjusting an inclination angle of the backrest frame 122 to provide suitable back support.

The two seat portions 118 and 120 are pivotally connected to each other, the seat portion 118 is pivotally connected to the side segments 102A of the leg frame 102, and the seat portion 120 is coupled to the two linkages 110. According to an example of construction, the seat portion 118 can be pivotally connected to the seat portion 120 via an articulation 128 so that the seat portion 118 is rotatable relative to the seat portion 120. The articulation 128 can have any suitable construction. For example, the articulation 128 can include a shaft that is disposed through pivot coupling portions provided on the seat portions 118 and 120 so that the seat portions 118 and 120 are rotatable around the shaft. An end of the seat portion 118 opposite to the articulation 128 can be pivotally connected to each side segment 102A of the leg frame 102 via an articulation 130 so that the seat portion 118 is rotatable relative to the leg frame 102. The articulation 130 can have any suitable construction. For example, the seat portion 118 can be pivotally connected to each side segment 102A of the leg frame 102 via a shaft forming the articulation 130. An end of the seat portion 120 opposite to the articulation 128 can be respectively connected pivotally to the two linkages 110 at the left and right side so that the seat portion 120 is rotatable relative to the two linkages 110. The linkages 110 are configured so that the seat portions 118 and 120 are movably linked to folding and unfolding of the child stroller apparatus 100, whereby the seat portions 118 and 120 can be folded over each other to form an acute angle when the child stroller apparatus 100 is folded and can be unfolded to extend generally along a same plane when the child stroller apparatus 100 is unfolded. The side segments 102A of the leg frame 102 can further be provided with a leg support 131, which is disposed adjacent to the location where the side segments 102A connect to the seat portion 118. The leg support 131 can extend transversally between the left and right side and connect to the two side segments 102A, and can extend forward and downward for supporting the legs of a child.

Referring to FIGS. 1-5, the two linkages 110 are respectively disposed at the left and right side of the child stroller apparatus 100. The linkage 110 disposed at one of the left and right side will be described in details hereinafter, the linkage 100 at the other side being identical in construction. The linkage 110 can include a support bar 132, a slider 134 and a frame link 136. The support bar 132 is respectively connected pivotally to the side segment 102A of the leg frame 102 and the side segment 104A of the leg frame 104 so that the support bar 132 is rotatable relative to the leg frames 102 and 104. The slider 134 is coupled to the seat assembly 108 and is slidably connected to the support bar 132. For example, the slider 134 can be pivotally connected to the seat portion 120 of the seat assembly 108 and slidably connected to the support bar 132 so that the seat portion 120 is rotatable relative to the slider 134. The slider 134 can slide along the support bar 132 between two pivot connections 138 and 140 thereof, wherein the support bar 132 is pivotally connected to the side segment 102A of the leg frame 102 via the pivot connection 138 and is pivotally connected to the side segment 104A of the leg frame 104 via the pivot connection 140. The pivot connection 138 between the side segment 102A of the leg frame 102 and the support bar 132 can be located between the two articulations 114 and 130, and the side segment 102A of the leg frame 102, the side segment 104A of the leg frame 104, the side segment 106A of the handle frame 106 and the support bar 132 can form a four-bar linkage.

According to an example of construction, the child stroller apparatus 100 can further include a front guard 142 that is fixedly connected to the support bar 132 at each of the left and right side. When a child sits in the child stroller apparatus 100, the front guard 142 can project forward from the leg frame 102 above the seat portion 118 and extend in front of the child, whereby the front guard 142 is adapted to restrict the child and serve as an armrest.

Referring to FIGS. 1-5, the frame link 136 is pivotally connected to the slider 134 so that the slider 134 slides along the support bar 132 as the child stroller apparatus 100 is folded and unfolded. The frame link 136 can be coupled to any suitable locations on the stroller frame 101 so that a sliding movement of the slider 134 along the support bar 132 toward the pivot connection 138 is linked to a folding movement of the stroller frame 101 via the frame link 136, and a sliding movement of the slider 134 along the support bar 132 toward the pivot connection 140 is linked to an unfolding movement of the stroller frame 101 via the frame link 136. Examples of suitable locations on the stroller frame 101 for coupling to the frame link 136 can include the articulation 114, a location on the side segment 102A of the leg frame 102 adjacent to the articulation 114, and a location on the side segment 106A of the handle frame 106 adjacent to the articulation 114.

According to an example of construction, the frame link 136 can be respectively connected pivotally to the articulation 114 and the slider 134. For example, the side segment 102A of the leg frame 102, the side segment 106A of the handle frame 106 and an end of the frame link 136 can be pivotally connected to one another in a coaxial manner at the articulation 114 so that the side segments 102A and 106A and the frame link 136 are rotatable relative to one another about a same axis. According to an embodiment, the frame link 136 can be a single linking bar having a first end pivotally connected at the pivot connection 114 and a second end pivotally connected to the slider 134. With the construction described herein, the slider 134 can slide toward the location where the support bar 132 pivotally connects to the side segment 102A of the leg frame 102 during folding of the child stroller apparatus 100, and can slide toward the location where the support bar 132 pivotally connects to the side segment 104A of the leg frame 104 during unfolding of the child stroller apparatus 100.

The seat portion 120 can be respectively connected pivotally to the backrest frame 122 and the slider 134 about a same axis or different axes, wherein the seat portion 120 can be pivotally connected to the backrest frame 122 and the slider 134 via one or multiple shaft(s) so that the seat portion 120 is rotatable relative to the slider 134 and the backrest frame 122. According to an embodiment, the seat assembly 108 is pivotally connected to the slider 134 about the axis X so that the seat assembly 108 is rotatable about the axis X relative to the slider 134. For example, the seat portion 120, the backrest frame 122 and the slider 134 can be pivotally connected to one another about the same axis X for providing a structure that is compact and can be conveniently operated. More details of an embodiment in which the seat portion 120, the backrest frame 122 and the slider 134 are pivotally connected to one another about the same axis X is described hereinafter.

Figure 6:
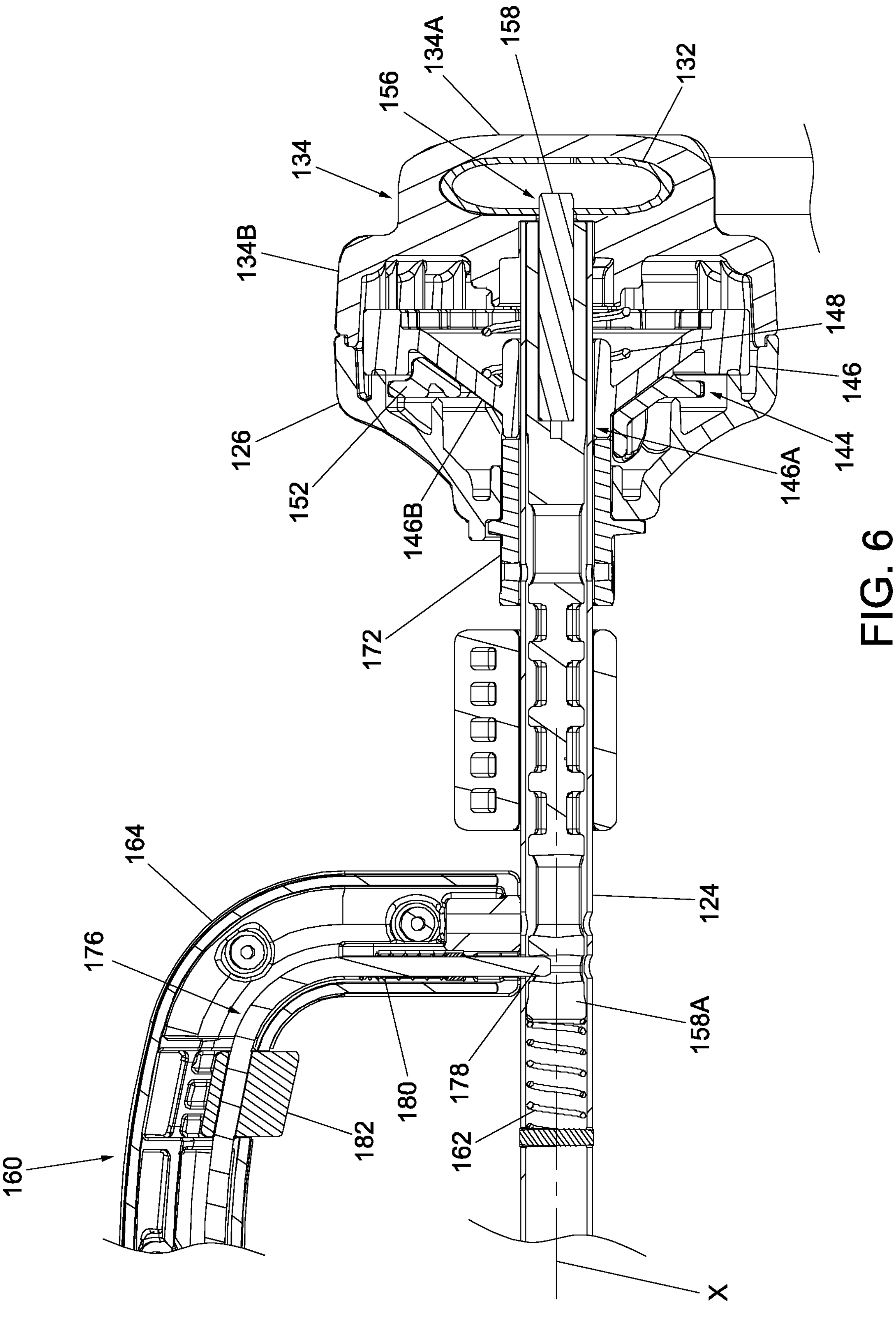
FIG. 6 is a cross-sectional view illustrating a connection region between a backrest frame and a slider in the child stroller apparatus shown in FIG. 1.
Figure 7:
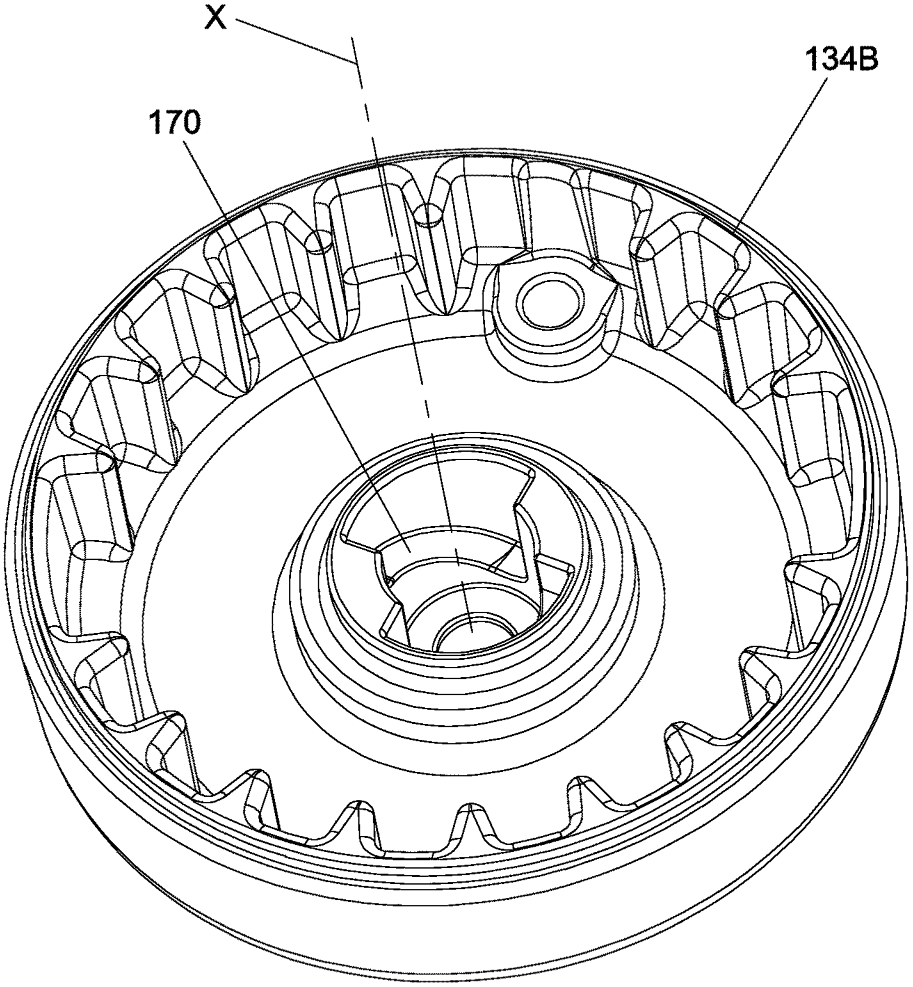
FIG. 7 is a perspective view illustrating some construction details of the slider in the child stroller apparatus shown in FIG. 1.
Figure 8:
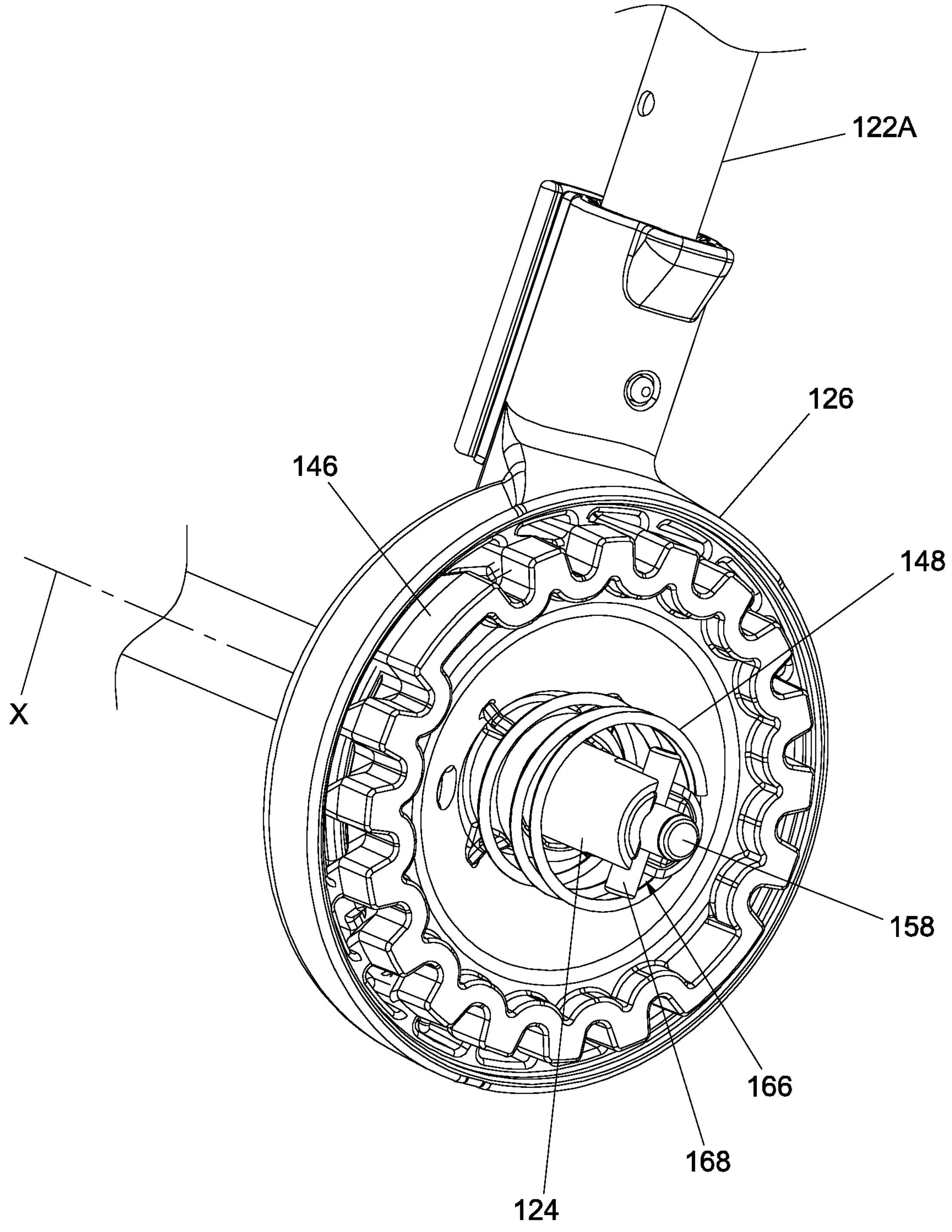
FIG. 8 is a perspective view illustrating some construction details inside a pivot coupling portion of the backrest frame in the child stroller apparatus shown in FIG. 1.

In conjunction with FIGS. 1-5, FIG. 6 is a cross-sectional view illustrating a connection region between the backrest frame 122 and the slider 134, FIG. 7 is a perspective view illustrating some construction details of the slider 134, and FIG. 8 is a perspective view illustrating some construction details inside the pivot coupling portion 126 of the backrest frame 122. Referring to FIGS. 1-8, the slider 134 can have a slide coupling portion 134A and a pivot coupling portion 134B fixedly connected to each other. According to an example of construction, the slider 134 including the slide coupling portion 134A and the pivot coupling portion 134B can be a single component integrally formed as one body. The slide coupling portion 134A can be slidably connected to the support bar 132 for sliding movement of the slider 134 along the support bar 132. According to an example of construction, the slide coupling portion 134A can have a hole through which is disposed the support bar 132 for slidably coupling the slider 134 to the support bar 132. It will be appreciated, however, that the sliding connection between the support bar 132 and the slider 134 is not limited to the illustrated example. According to another example of construction, a guide track may be disposed along the support bar 132, and the slide coupling portion 134A of the slider 134 may be configured to slidably connect to the guide track.

The pivot coupling portion 126 on the side segment 122A of the backrest frame 122 can be pivotally connected to the pivot coupling portion 134B of the slider 134 so that the backrest frame 122 is rotatable about the axis X relative to the slider 134. Moreover, the shaft 124 can extend through the pivot coupling portion 126 and connect to the pivot coupling portion 134B of the slider 134, and the seat portion 120 of the seat assembly 108 can be pivotally connected around the shaft 124 so that the seat portion 120 is pivotally connected to the slider 134 about the shaft 124 and hence the axis X. Accordingly, the seat portion 120 is rotatable about the axis X relative to the slider 134 and the backrest frame 122, wherein the seat portion 120 can rotate around the shaft 124. In the assembly described herein, the shaft 124 is thus carried with the slider 134 and can slide along with the slider 134 along the support bar 132 at each of the left and right side, the backrest frame 122 can rotate around the shaft 124 relative to the seat portion 120 and the sliders 134, and the seat portion 120 can also rotate around the shaft 124 relative to the backrest frame 122 and the sliders 134. When the child stroller apparatus 100 is folded, the seat portions 118 and 120 fold over each other, and the slider 134 and the shaft 124 slide in unison toward the location where the support bar 132 pivotally connects to the side segment 102A of the leg frame 102. When the child stroller apparatus 100 is unfolded, the seat portions 118 and 120 unfold relative to each other, and the slider 134 and the shaft 124 slide in unison toward the location where the support bar 132 pivotally connects to the side segment 104A of the leg frame 104.

Referring to FIGS. 1, 2, 4 and 6-8, the child stroller apparatus 100 further includes a backrest locking mechanism 144 configured to lock the backrest frame 122 to the slider 134 for preventing rotation of the backrest frame 122 relative to the slider 134. The backrest locking mechanism 144 can include a locking part 146, a resilient element 148 and a release actuator 150. The locking part 146 can be slidably connected to the shaft 124 so that the locking part 146 can slide along the shaft 124 between a locking position and an unlocking position. In the locking position, the locking part 146 engages with the pivot coupling portion 126 of the backrest frame 122 and the pivot coupling portion 134B of the slider 134 to prevent rotation of the backrest frame 122 relative to the slider 134. In the unlocking position, the locking part 146 disengages from one of the pivot coupling portion 126 of the backrest frame 122 and the pivot coupling portion 134B of the slider 134 for rotation of the backrest frame 122 relative to the slider 134. The locking part 146 can have a circumference provided with a plurality of protruding teeth, which can engage with the pivot coupling portion 126 of the backrest frame 122 and the pivot coupling portion 134B of the slider 134 in the locking position for preventing relative rotation between the pivot coupling portion 126 and the pivot coupling portion 134B. For facilitating the sliding connection between the locking part 146 and the shaft 124, the locking part 146 can have a hole 146A, and the shaft 124 can be disposed through the hole 146A, whereby the locking part 146 can slide along the axis X relative to the pivot coupling portion 126 of the backrest frame 122 and the pivot coupling portion 134B of the slider 134.

The resilient element 148 is connected to the locking part 146, and is configured to apply an elastic force for biasing the locking part 146 toward the locking position. The resilient 148 can include, e.g., a spring. According to an example of construction, the locking part 146 is disengaged from the pivot coupling portion 126 of the backrest frame 122 in the unlocking position, and the resilient element 148 is respectively connected to the slider 134 and the locking part 146.

The release actuator 150 is connected to the locking part 146, and is operable to cause the locking part 146 to slide toward the unlocking position. According to an example of construction, the release actuator 150 can include an actuating portion 152 and an operating portion 154. The actuating portion 152 can be disposed inside the pivot coupling portion 126 of the backrest frame 122 and can be in sliding contact with the locking part 146. The operating portion 154 can be fixedly connected to the actuating portion 152, can extend outside the pivot coupling portion 126 of the backrest frame 122, and can be slidably connected to the side segment 122A of the backrest frame 122 via the pivot coupling portion 126. According to an example of construction, the release actuator 150 is slidable relative to the backrest frame 122 along a sliding direction that extends generally radially with respect to the shaft 124, and the actuating portion 152 can be in sliding contact with a ramp surface 146B provided on the locking part 146. The release actuator 150 is operable to urge the locking part 146 to slide against the elastic force of the resilient element 148 from the locking position to the unlocking position.

According to an example of construction, the locking part 146 and the resilient element 148 described previously can be provided at each of the left and right side of the seat assembly 108, and the operating portion 154 of the release actuator 150 can be provided with the actuating portion 152 described previously at each of the left and right side, whereby the release actuator 150 is operable to cause the two locking parts 146 at the left and right side to unlock in a concurrent manner.

Referring to FIGS. 1 and 6-8, the child stroller apparatus 100 can further include a frame locking mechanism 156 having a locking state and an unlocking state, wherein the frame locking mechanism 156 locks the slider 134 to the support bar 132 in the locking state, and allows sliding of the slider 134 along the support bar 132 in the unlocking state. The frame locking mechanism 156 can include a latch 158 movable to lock and unlock the slider 134 with respect to the support bar 132. According to an example of construction, the latch 158 is at least partially received inside the slider 134, and is movable relative to the slider 134 to engage with and disengage from the support bar 132. The latch 158 is engaged with the support bar 132 in the locking state to prevent the slider 134 from sliding relative to the support bar 132, whereby the child stroller apparatus 100 can be locked in the unfolded state. The latch 158 is disengaged from the support bar 132 in the unlocking state so that the slider 134 can slide along the support bar 132 for folding or unfolding the child stroller apparatus 100.

According to an example of construction, the latch 158 is configured to slide relative to the slider 134 for engaging with and disengaging from the support bar 132. More specifically, the shaft 124 can have a hollow interior, and the latch 158 can be disposed to slide along the hollow interior of the shaft 124 inside the slider 134. For example, the latch 158 can be slidably connected to the shaft 124, whereby the latch 158 is slidable along the axis X relative to the shaft 124 and the slider 134 for engaging with and disengaging from the support bar 132.

Referring to FIGS. 1 and 6-8, the frame locking mechanism 156 can further include a latch actuator 160 and a resilient element 162. The latch actuator 160 is connected to the latch 158, and is operable to cause the latch 158 to move relative to the slider 134 for disengaging from the support bar 132. According to an example of construction, the latch actuator 160 and the latch 158 are configured to move in a concurrent manner to cause the latch 158 to engage with and disengage from the support bar 132. Accordingly, a caregiver can operate the latch actuator 160 to switch the frame locking mechanism 156 to either of the unlocking state and the locking state as desired.

Referring to FIGS. 1 and 6-8, the latch actuator 160 can include the shaft 124 and a handle 164. The handle 164 can be fixedly connected to the shaft 124 and can project from the shaft 124 along a generally radial direction, whereby a caregiver can use a hand to grasp the handle 164 and operate the latch actuator 160. According to an example of construction, the latch actuator 160 has at least a portion configured to be rotatable about the axis X. For example, the shaft 124 can be pivotally connected to the pivot coupling portion 134B of the slider 134, whereby the shaft 124 can rotate about the axis X relative to the slider 134. Accordingly, the latch actuator 160 is pivotally connected to the slider 134 about the axis X, and can rotate about the axis X relative to the slider 134.

The latch 158 is slidably connected to the latch actuator 160, and can rotate along with the latch actuator 160 about the axis X. For example, the latch actuator 160 can have a guide slot 166 arranged on the shaft 124, and the latch 158 can have a protrusion 168 slidably connected through the guide slot 166. Through the sliding connection between the guide slot 166 and the protrusion 168, the latch 158 and the latch actuator 160 can rotate concurrently about the axis X, and the latch 158 can slide along the axis X relative to the latch actuator 160. Moreover, the latch 158 can be in sliding contact with an interacting surface 170 (better shown in FIG. 7) provided on the slider 134, wherein at least one of the latch 158 and the interacting surface 170 has a ramp surface. Accordingly, a rotation of the latch actuator 160 about the axis X can cause the latch 158 to concurrently rotate and slide along the axis X. According to an example of construction, the interacting surface 170 is a ramp surface. The interacting surface 170 can be disposed in the pivot coupling portion 134B of the slider 134 and at a periphery of the shaft 124, and the protrusion 168 of the latch 158 can be in sliding contact with the interacting surface 170. According to another example of construction, the ramp surface can be provided on the latch 158, and the interacting surface 170 can be defined on a protrusion in sliding contact with the ramp surface, whereby a rotation of the latch actuator 160 about the axis X can likewise cause the latch 158 to concurrently rotate and slide along the axis X. Accordingly, the latch actuator 160 is operable to cause the latch 158 to slide relative to the shaft 124 and the slider 134 for engaging with or disengaging from the support bar 132.

Referring to FIG. 6, the resilient element 162 can be disposed inside the shaft 124 and can be connected to the latch 158. For example, the resilient element 162 can be a spring having two ends respectively connected to the shaft 124 and the latch 158. The resilient element 162 can apply an elastic force adapted to keep the latch 158 in sliding contact with the interacting surface 170.

Figure 9:
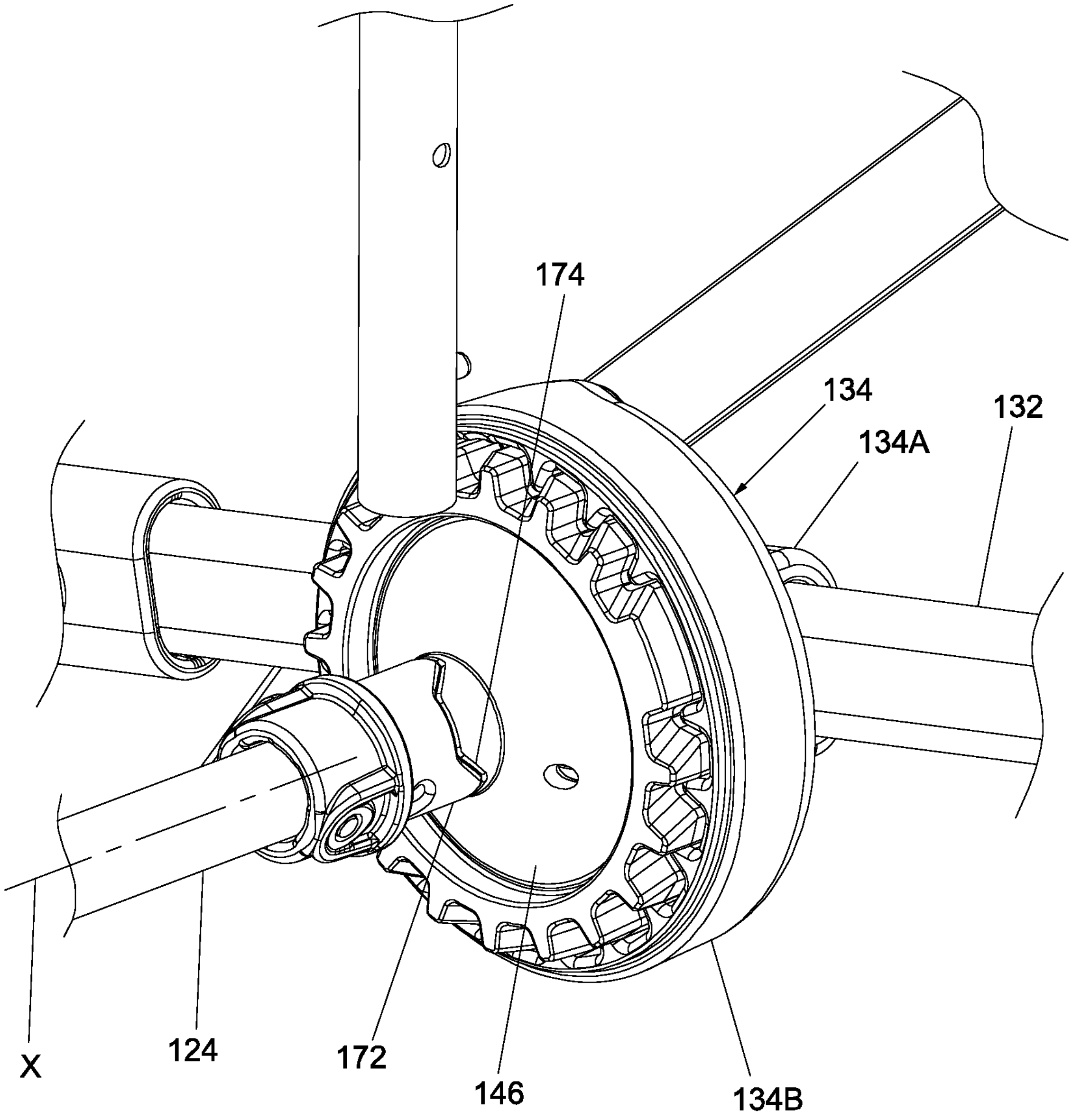
FIG. 9 is a perspective view illustrating some construction details of a backrest locking mechanism and a frame locking mechanism in the child stroller apparatus shown in FIG. 1.

Referring to FIG. 6, the shaft 124 can further have an abutting portion 172 in sliding contact with the locking part 146 of the backrest locking mechanism 144. The abutting portion 172 is exemplarily connected fixedly to the shaft 124 and can rotate along with the shaft 124 about the axis X. As shown in FIG. 9, the sliding contact between the abutting portion 172 and the locking part 146 can be achieved through a ramp surface 174, whereby the shaft 124 and the abutting portion 172 are concurrently rotatable about the axis X to urge the locking part 146 to slide toward the unlocking position. As a result, when a caregiver rotates the latch actuator 160 for switching the frame locking mechanism 156 to the unlocking state, the locking part 146 can be concurrently urged by the abutting portion 172 of the latch actuator 160 to slide toward the unlocking position. Accordingly, the backrest locking mechanism 144 can be conveniently unlocked without the need of operating the release actuator 150 thereof, which allows rotation of the backrest frame 122 about the axis X for reducing the volume of the child stroller apparatus 100.

According to an example of construction, the latch 158, the resilient element 162 and the abutting portion 172 described previously can be provided at each of the left and right side of the seat assembly 108, and the latch actuator 160 is operable to cause the two latches 158 at the left and right side to move concurrently for engaging with or disengaging from the corresponding support bars 132, and to cause the two locking parts 146 at the left and right side to unlock concurrently.

Referring to FIGS. 4 and 6, the child stroller apparatus 100 can further include a safety lock mechanism 176 configured to prevent accidental unlocking of the latch 158. The safety lock mechanism 176 can include an impeding part 178, a resilient element 180 and a releasing part 182. The impeding part 178 can extend inside the handle 164, and is movable into the shaft 124 for engaging with the latch 158. For example, the latch 158 can have an extension 158A located inside the shaft 124, and the impeding part 178 can engage with the extension 158A to prevent the latch 158 from switching from the locking state to the unlocking state. According to an example of construction, the impeding part 178 can be slidably connected to the handle 164 for sliding generally radially relative to the shaft 124. The resilient element 180 can be respectively connected to the impeding part 178 and the handle 164, wherein the resilient element 180 is exemplarily a spring. The resilient element 180 can apply an elastic force adapted to urge the impeding part 178 to move for engaging with the latch 158. The releasing part 182 is assembled with the handle 164 of the latch actuator 160, and is connected to the impeding part 178. According to an example of construction, the releasing part 182 may be a push button movable to protrude outward from and retract into the handle 164. The releasing part 182 is operable to cause the impeding part 178 to move and disengage from the latch 158 so that the latch 158 is allowed to switch from the locking state to the unlocking state.

In conjunction with FIGS. 1-9, reference is made hereinafter to FIGS. 10 and 11 to describe a folding operation of the child stroller apparatus 100. When the child stroller apparatus 100 is in the unfolded state, the slider 134 at each of the left and right side is located adjacent to the location where the support bar 132 pivotally connects to the side segment 104A of the leg frame 104, the seat portions 118 and 120 extend generally along a same plane, and the frame locking mechanism 156 is in the locking state so that the child stroller apparatus 100 is locked in the unfolded state. For folding the child stroller apparatus 100, a caregiver can grasp the handle 164 of the latch actuator 160 with one hand and at the same time press the releasing part 182, which unlocks the safety lock mechanism 176. Then the latch actuator 160 is rotated upward, which causes the frame locking mechanism 156 to switch to the unlocking state. The latch actuator 160 is then lifted to urge the slider 134 to slide along the support bar 132 away from the location where the support bar 132 pivotally connects to the side segment 104A of the leg frame 104, which causes the seat portions 118 and 120 to fold toward each other, and through the frame link 136 urges the leg frames 102 and 104 and the handle frame 106 to fold, as shown in FIG. 10.

Figure 10:
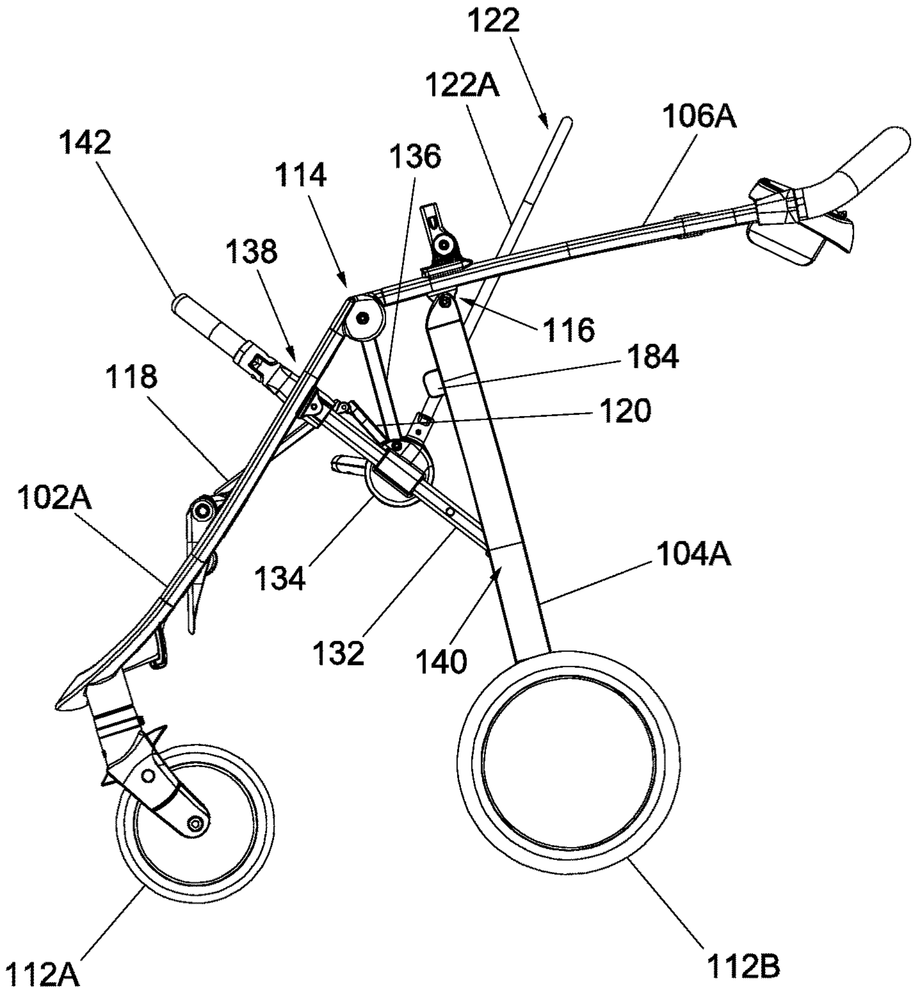
FIG. 10 is a side view illustrating exemplary folding operation of the child stroller apparatus shown in FIG. 1.
Figure 11:
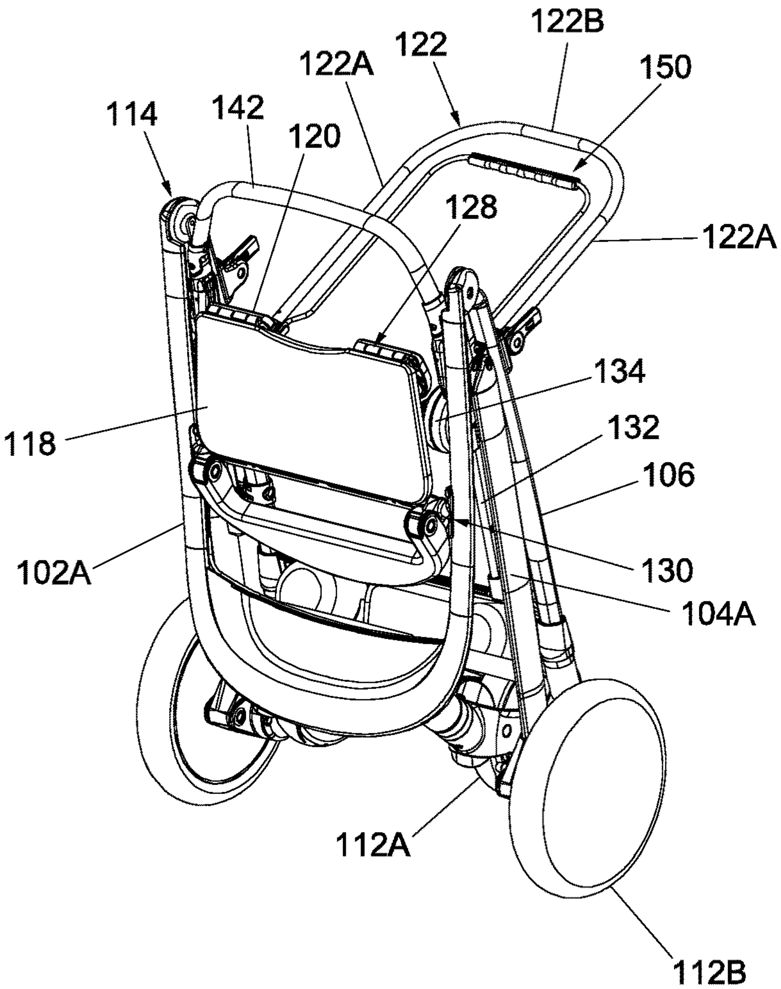
FIG. 11 is a perspective view illustrating the child stroller apparatus of FIG. 1 in a fully folded state.
Figure 12:
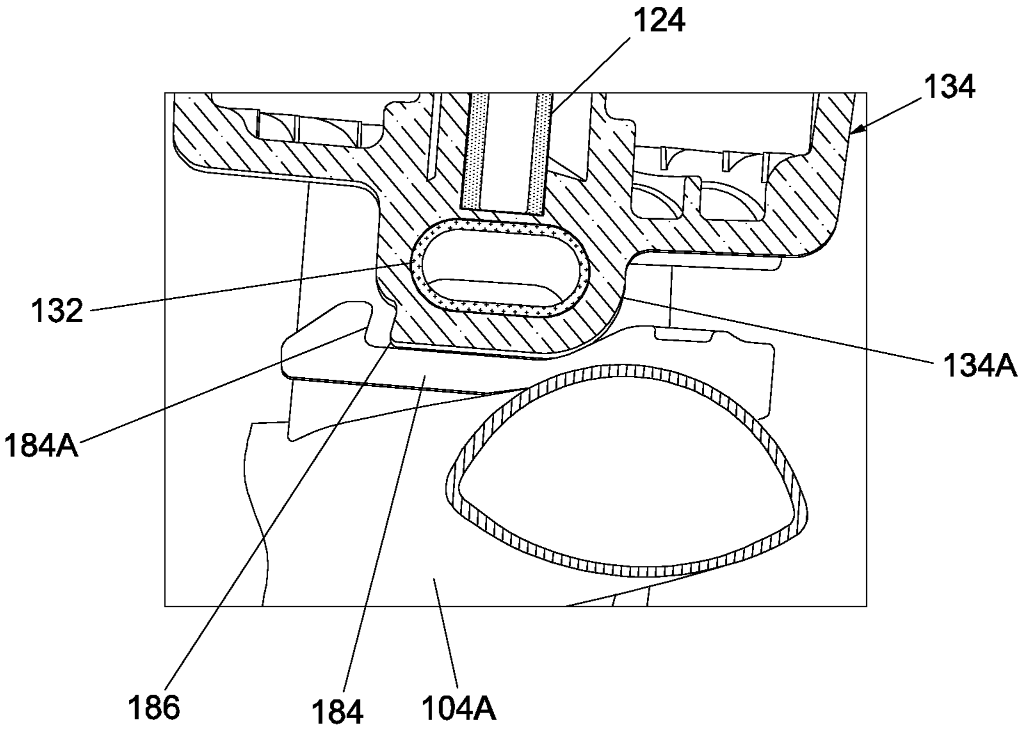
FIG. 12 is a schematic view illustrating a fastener engaged with the slider in the child stroller apparatus of FIG. 1 occurring when the child stroller apparatus is fully folded.

Referring to FIGS. 10 and 11, when the child stroller apparatus 100 is fully folded, the support bar 132 can be folded toward the side segment 104A of the leg frame 104, and the slider 134 can be located adjacent to the location where the support bar 132 pivotally connects to the side segment 102A of the leg frame 102. According to an embodiment, the side segment 104A of the leg frame 104 can have a fastener 184 configured to engage with the slider 134 when the child stroller apparatus 100 is in the folded state, which can assist in holding the child stroller apparatus 100 in the folded state. According to an example of construction, the fastener 184 can be fixedly connected to the side segment 104A of the leg frame 104, and is configured to elastically deform for engaging with or disengaging from the slider 134. In conjunction with FIG. 11, FIG. 12 is a schematic view illustrating the fastener 184 engaged with the slider 134. Referring to FIGS. 11 and 12, the fastener 184 may exemplarily engage with the slide coupling portion 134A of the slider 134 for holding the child stroller apparatus 100 in the folded state. For example, the fastener 184 can have a hook 184A, and the slide coupling portion 134A can have a projection 186 adapted to engage with the hook 184A.

Figure 13:
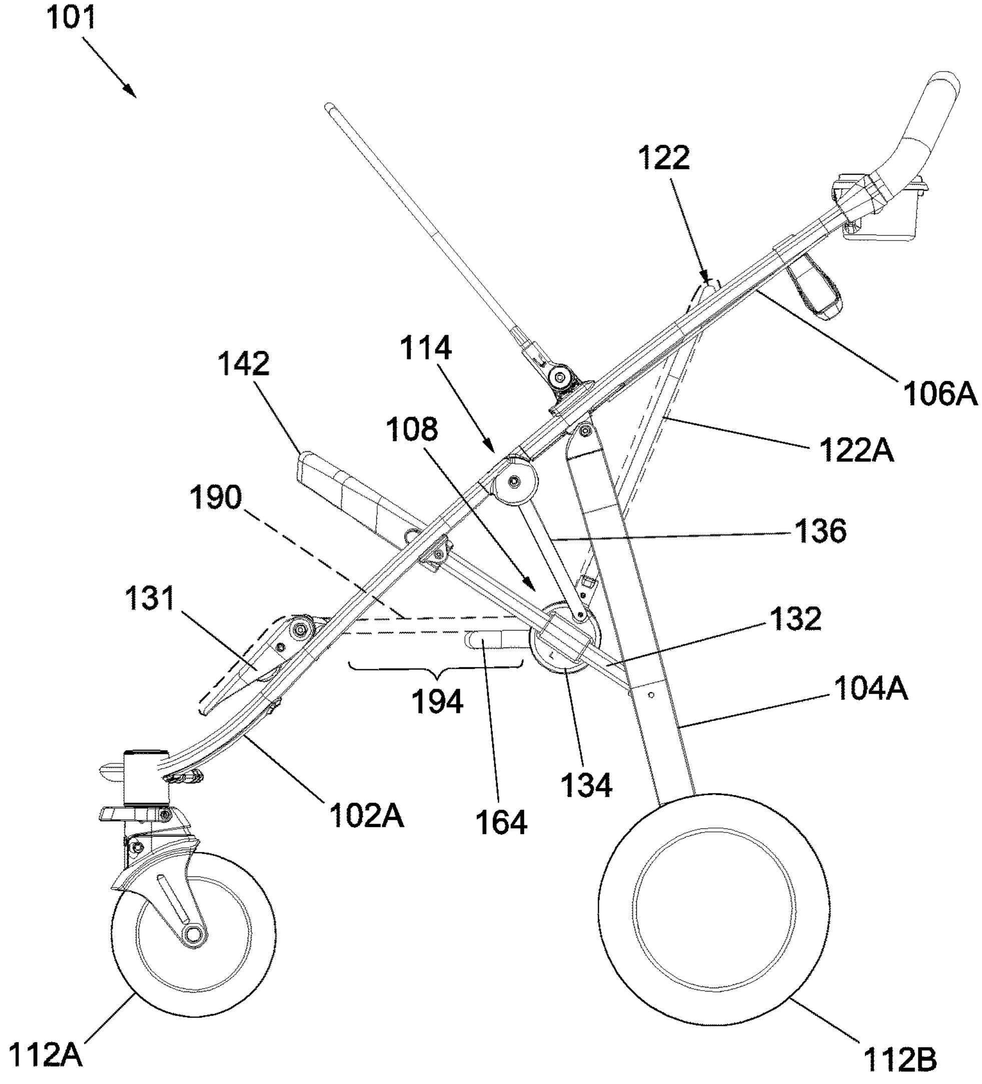
FIG. 13 is a side view illustrating another embodiment of the child stroller apparatus.
Figure 14:
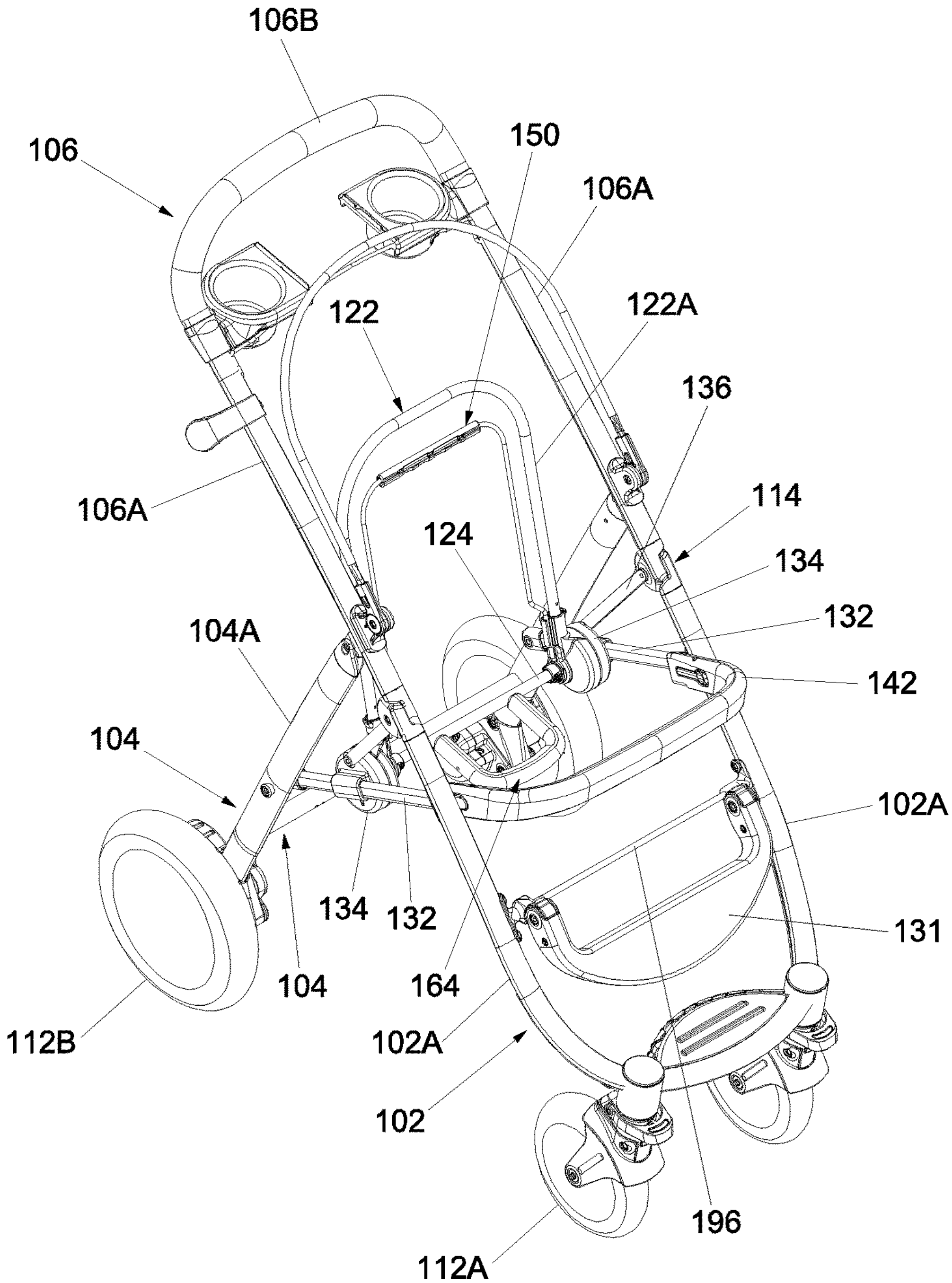
FIG. 14 is a schematic view illustrating the child stroller apparatus of FIG. 13 without a softgoods member installed thereon.
Figure 15:
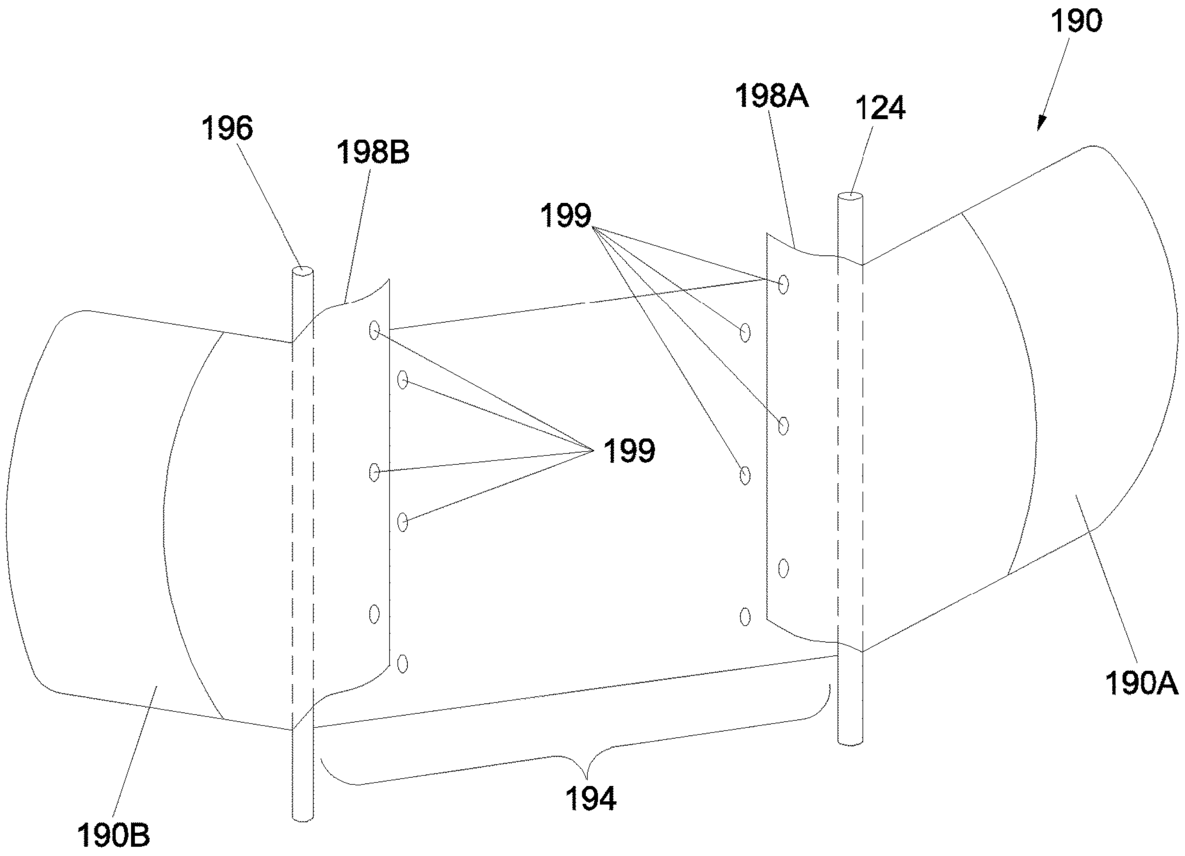
FIG. 15 is a schematic view illustrating some construction details of a softgoods member suitable for use with the child stroller apparatus of FIG. 13.
Figure 16:
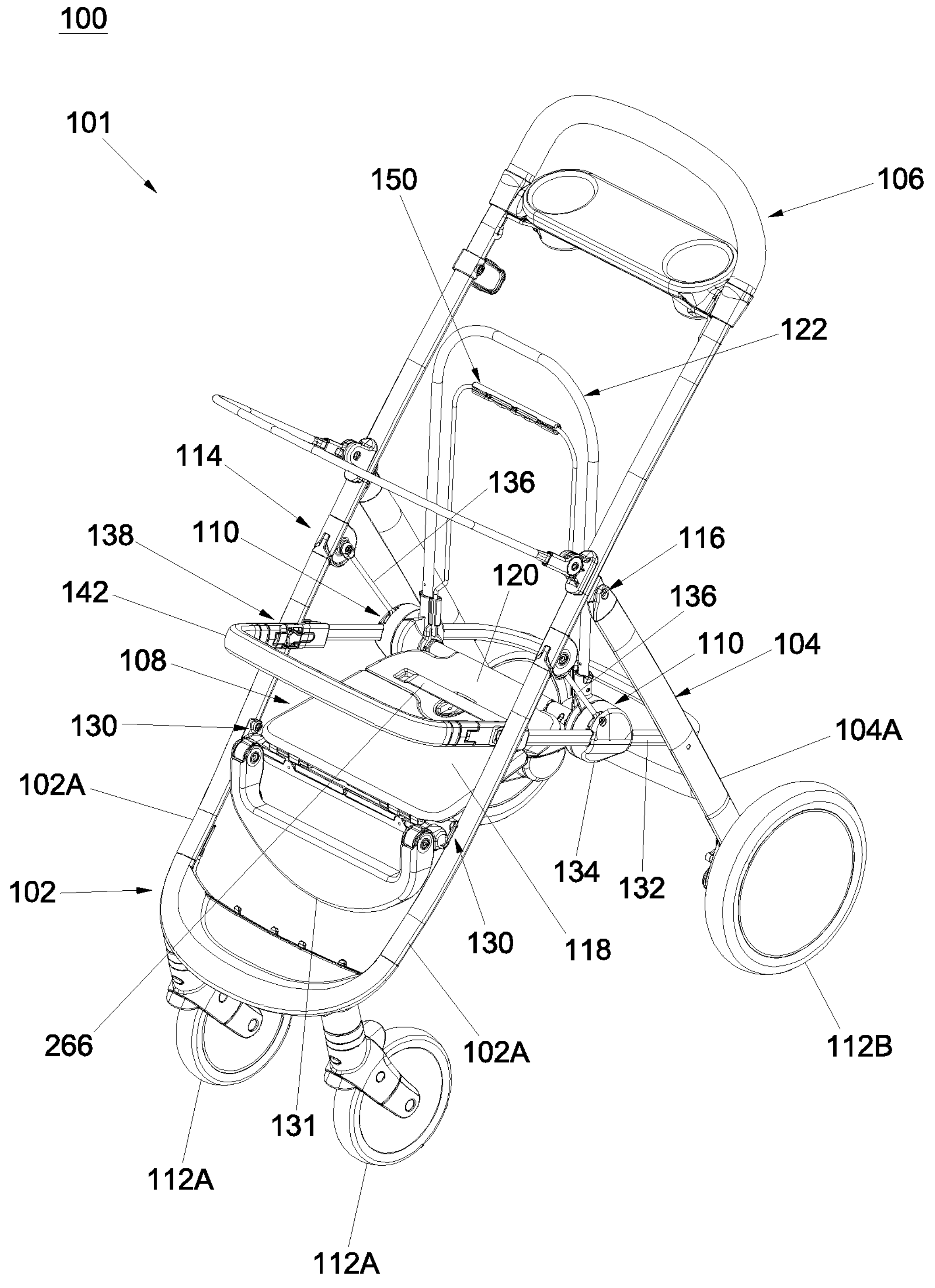
FIG. 16 is a perspective view illustrating a variant embodiment of the child stroller apparatus shown in FIG. 1.
Figure 17:
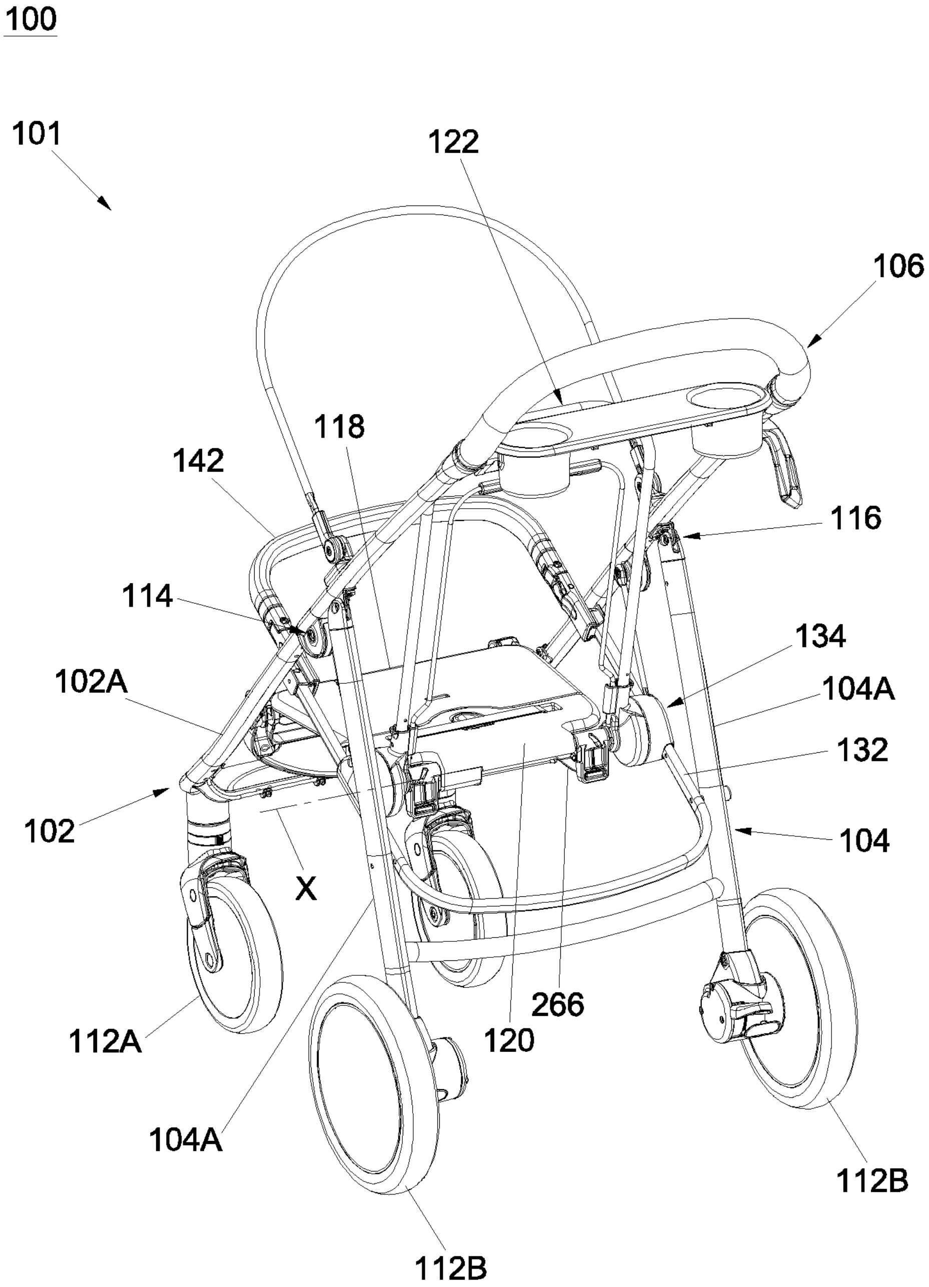
FIG. 17 is a perspective view illustrating the child stroller apparatus of FIG. 16 under a different angle of view.
Figure 18:
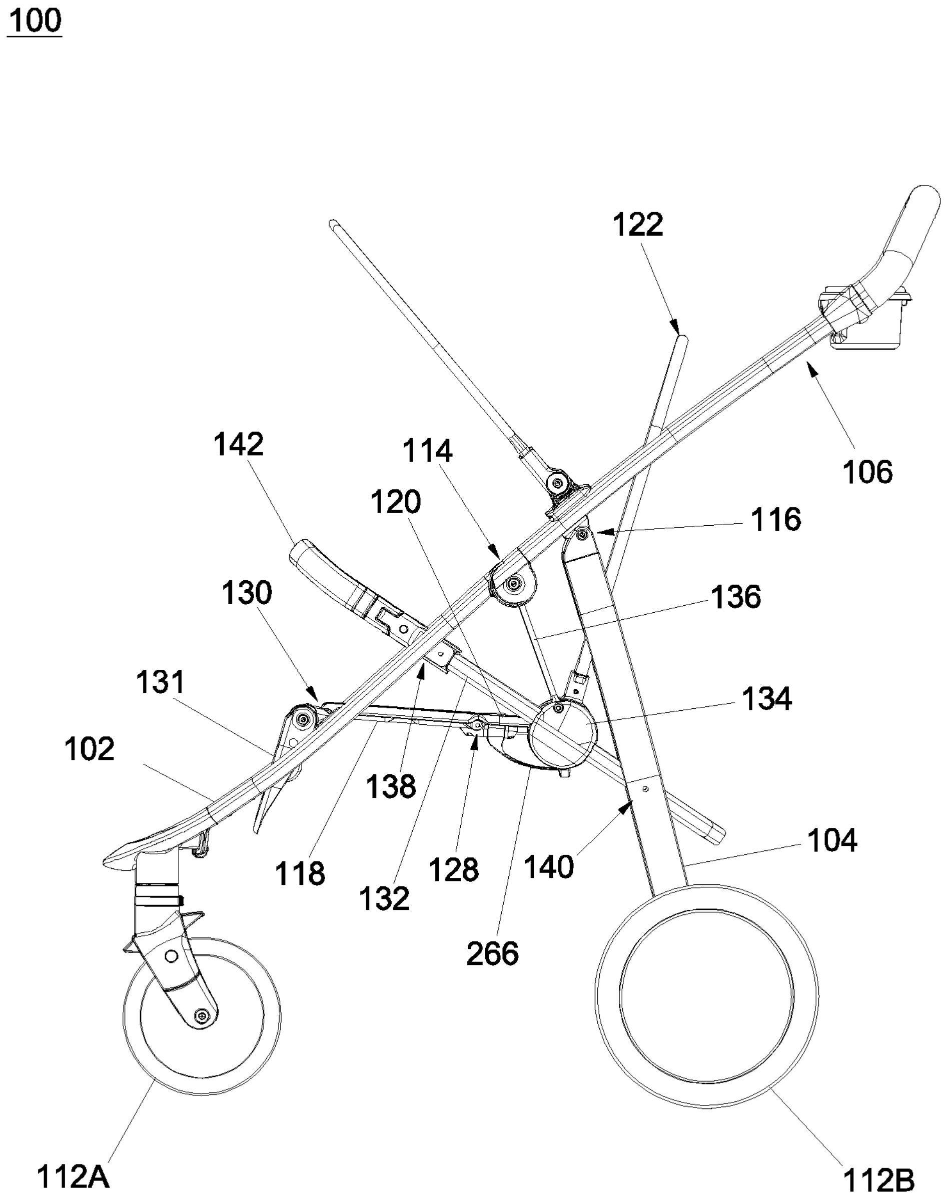
FIG. 18 is a side view of the child stroller apparatus shown in FIG. 16.
Figure 19:
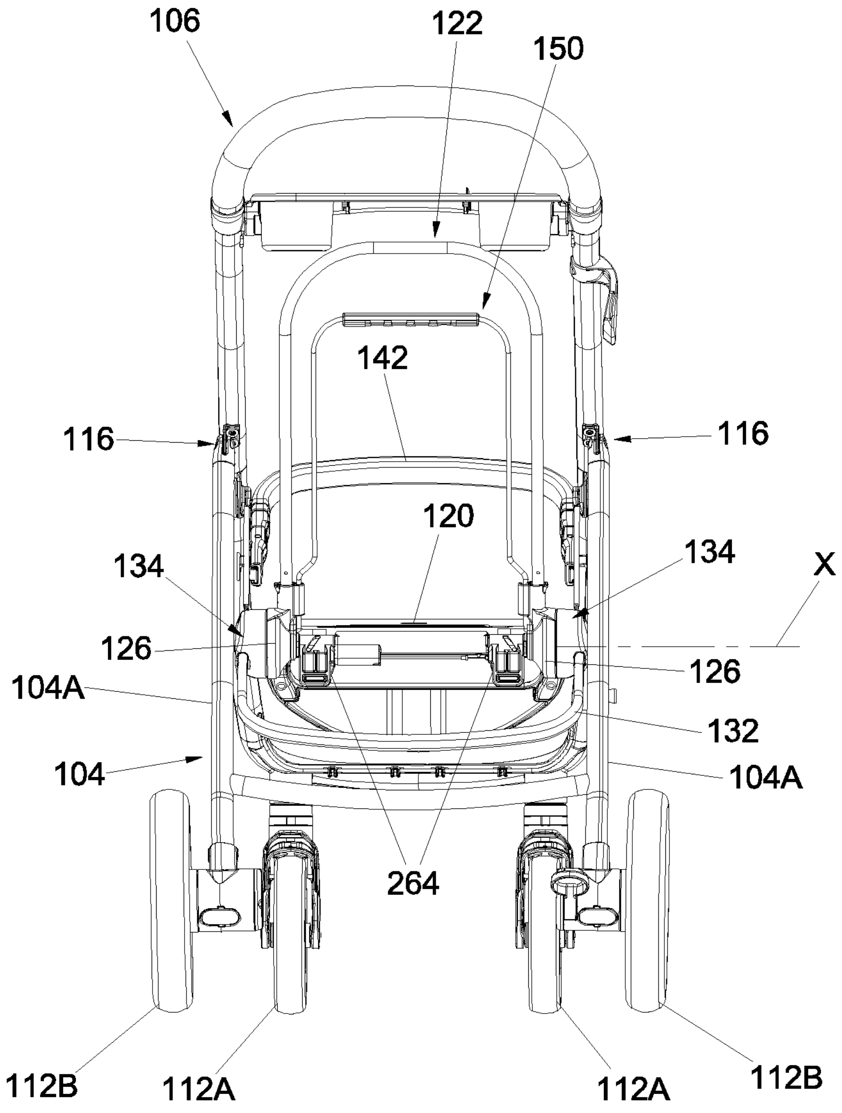
FIG. 19 is a rear view of the child stroller apparatus shown in FIG. 16.
Figure 20:
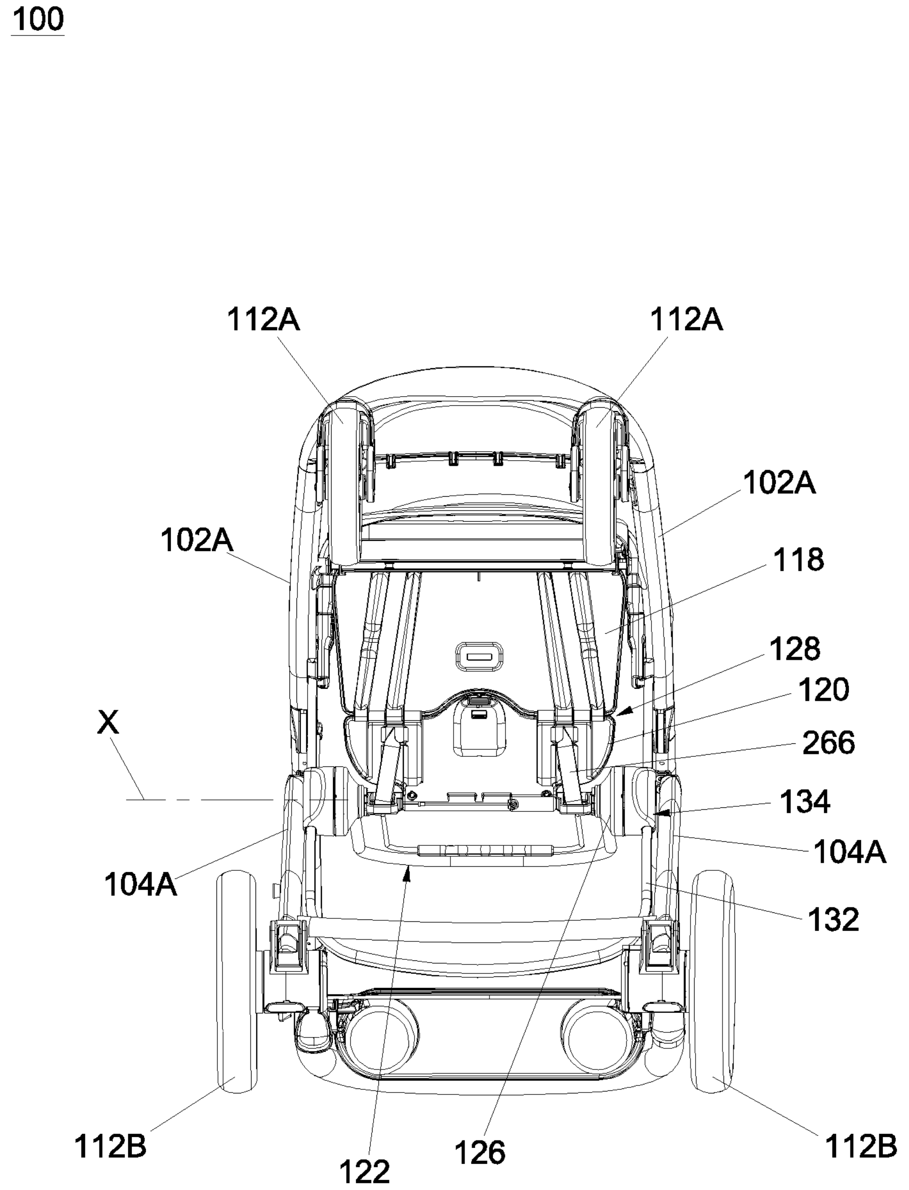
FIG. 20 is a bottom view of the child stroller apparatus shown in FIG. 16.
Figure 21:
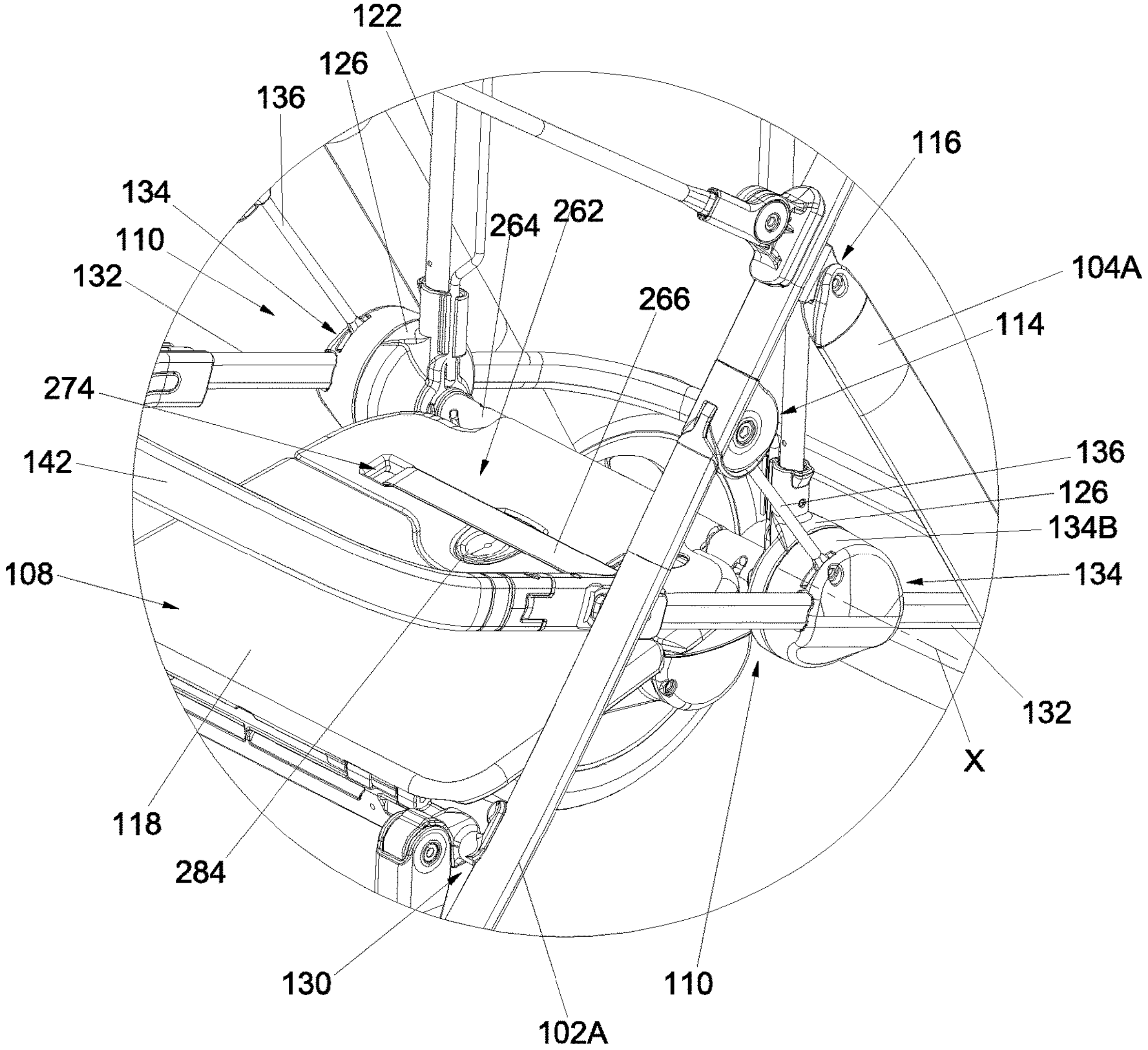
FIG. 21 is an enlarged view of a portion of the child stroller apparatus shown in FIG. 16.
Figure 22:
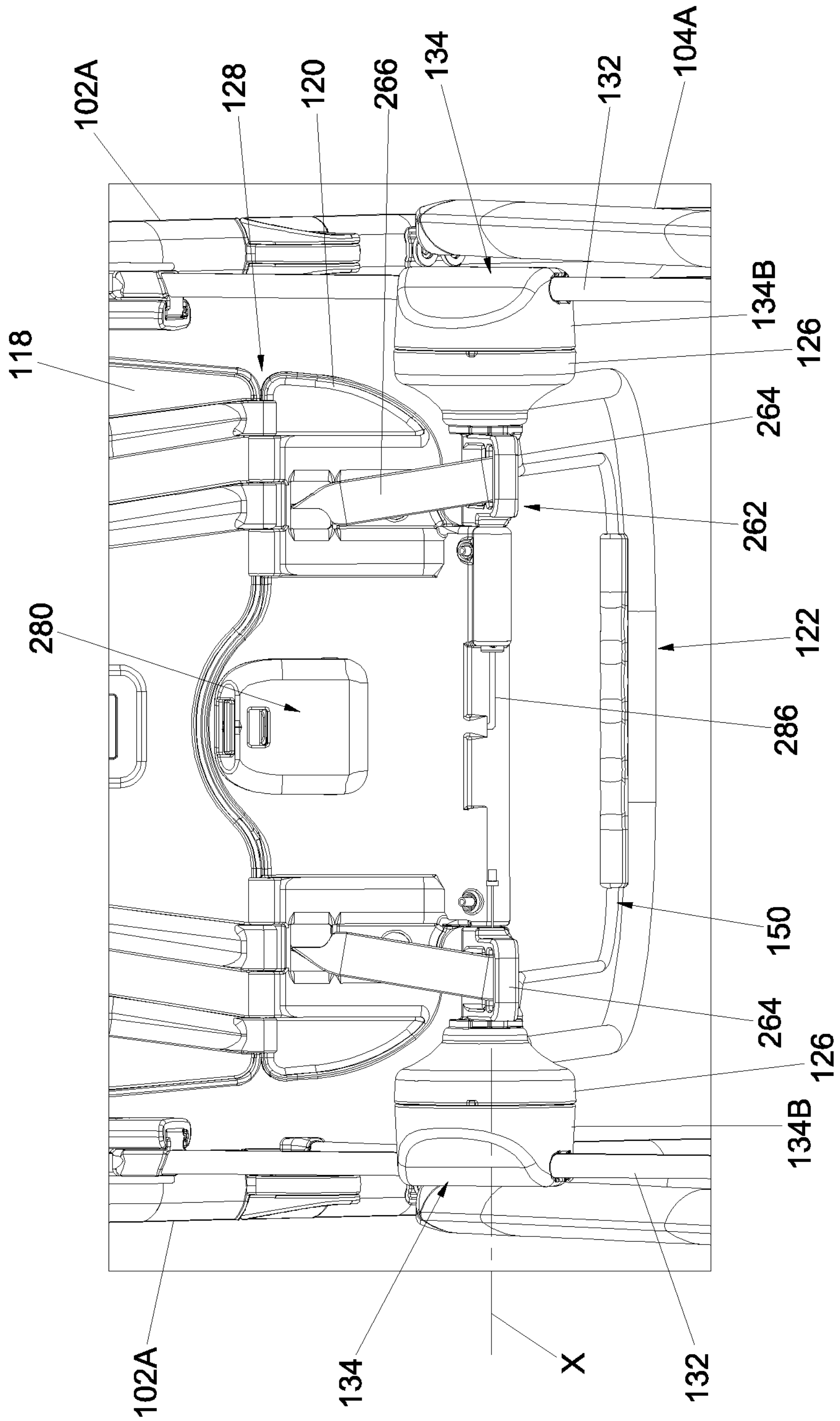
FIG. 22 is an enlarged bottom view of a portion of the child stroller apparatus shown in FIG. 20.
Figure 23:
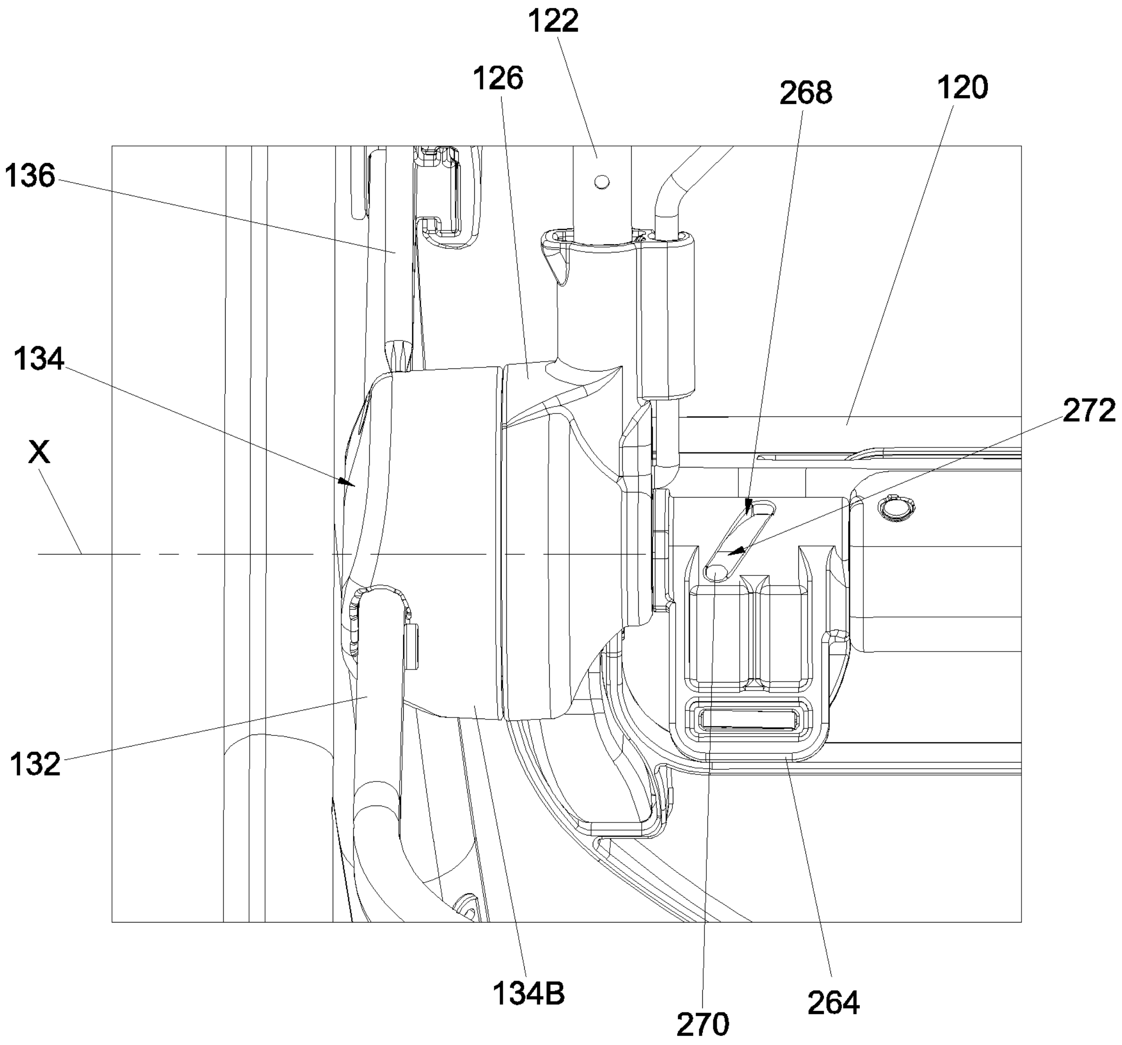
FIG. 23 is an enlarged rear view of a portion of the child stroller apparatus shown in FIG. 19.

FIGS. 13-15 are schematic views illustrating another embodiment of the child stroller apparatus 100. In the child stroller apparatus 100 of FIGS. 13-15, the seat assembly 108 does not have the seat portions 118 and 120 of the previous embodiment, the remaining structure of the previous embodiment and the operation thereof being identical to the embodiment of FIGS. 13-15. Referring to FIGS. 13-15, the seat assembly 108 of the child stroller apparatus 100 includes a softgoods member 190 (shown with phantom lines in FIG. 13) that is connected to the backrest frame 122 and is coupled to the side segments 102A of the leg frame 102. FIG. 13 illustrates the softgoods member 190 with phantom lines, FIG. 14 is a schematic view illustrating the child stroller apparatus 100 without the softgoods member 190 installed thereon, and FIG. 15 is a schematic view illustrating some construction details of the softgoods member 190. The softgoods member 190 can include any suitable soft materials, e.g., a fabric material, a flexible pad, and the like. According to an example of construction, the softgoods member 190 can be configured to respectively anchor to the backrest frame 122 and the leg support 131. For example, the softgoods member 190 can have two ends respectively provided with two pockets 190A and 190B, the backrest frame 122 can be at least partially received inside the pocket 190A so that the softgoods member 190 is anchored to the backrest frame 122 at one end, and the leg support 131 can be at least partially received inside the pocket 190B so that the softgoods member 190 is anchored to the leg support 131 at the other opposite end. For a secure connection, the softgoods member 190 may further be anchored to the shaft 124 and a transversal bar 196 provided on the leg frame 102. The transversal bar 196 can extend generally parallel to the shaft 124 from the left side to the right side at a location adjacent to the leg support 131, and can be fixedly connected to the two side segments 102A of the leg frame 102. The softgoods member 190 can be respectively anchored to the shaft 124 and the transversal bar 196 via two strips 198A and 198B, wherein each of the strips 198A and 198B can be made of a flexible material and can extend at an underside of the softgoods member 190. The strip 198A can wrap around the shaft 124 and attach to the softgoods member 190 at two opposite ends of the strip 198A, whereby the shaft 124 is restricted in position relative to the softgoods member 190. Likewise, the strip 198B can wrap around the transversal bar 196 and attach to the softgoods member 190 at two opposite ends of the strip 198B, whereby the transversal bar 196 is restricted in position relative to the softgoods member 190. According to an example of construction, the strips 198A and 198B may be attached to the softgoods member 190 in a similar way: one of the two opposite ends of each of the strips 198A and 198B may be permanently affixed to the softgoods member 190 (e.g., by sewing), and the other one of the two opposite ends of each of the strips 198A and 198B may be detachably connected to the softgoods member 190 via one or more fasteners 199 (e.g., snap fasteners, buttons, and the like).

For coupling the softgoods member 190 to the leg frame 102, the softgoods member 190 is not necessarily anchored to both the leg support 131 and the transversal bar 196, and may be anchored to only one of the leg support 131 and the transversal bar 196. For example, a variant embodiment can omit the leg support 131 and have the softgoods member 190 anchored to only the transversal bar 196 for coupling the softgoods member 190 to the leg frame 102, or can omit the transversal bar 196 and have the softgoods member 190 anchored to only the leg support 131 for coupling the softgoods member 190 to the leg frame 102.

Once the softgoods member 190 is installed, the softgoods member 190 can define a seat portion 194 between the side segments 102A of the leg frame 102 and the backrest frame 122 (in particular between the transversal bar 196 and the shaft 124) that is adapted to provide seating support for a child. The softgoods member 190 can further include an opening (not shown) through which a caregiver can access and operate the handle 164. In the embodiment shown in FIGS. 13-15, the seat assembly 108 is coupled to the slider 134 at each of the left and right side, and the slider 134 is slidable along the support bar 132 as described previously for folding and unfolding the seat portion 194 defined by the softgoods member 190, the sliding movement of the slider 134 along the support bar 132 being linked to the folding and unfolding movement of the stroller frame 101 via the frame link 136.

According to a variant embodiment, the child stroller apparatus 100 shown in FIGS. 1-12 may further include a softgoods member similar to the softgoods member 190 provided with the two pockets 190A and 190B, which can be respectively anchored to the backrest frame 122 and the leg support 131. For a secure attachment of the softgoods member to the child stroller apparatus 100, the softgoods member may have flexible strips (not shown) that may be tied around the shaft 124 and/or the leg frame 102. Alternatively or in addition to the use of flexible strips, the softgoods member may also be attached to the child stroller apparatus 100 through a sewing method. It will be appreciated that the attachment of the softgoods member to the child stroller apparatus 100 is not limited to the aforementioned examples, and other methods may be possible.

Figure 24:
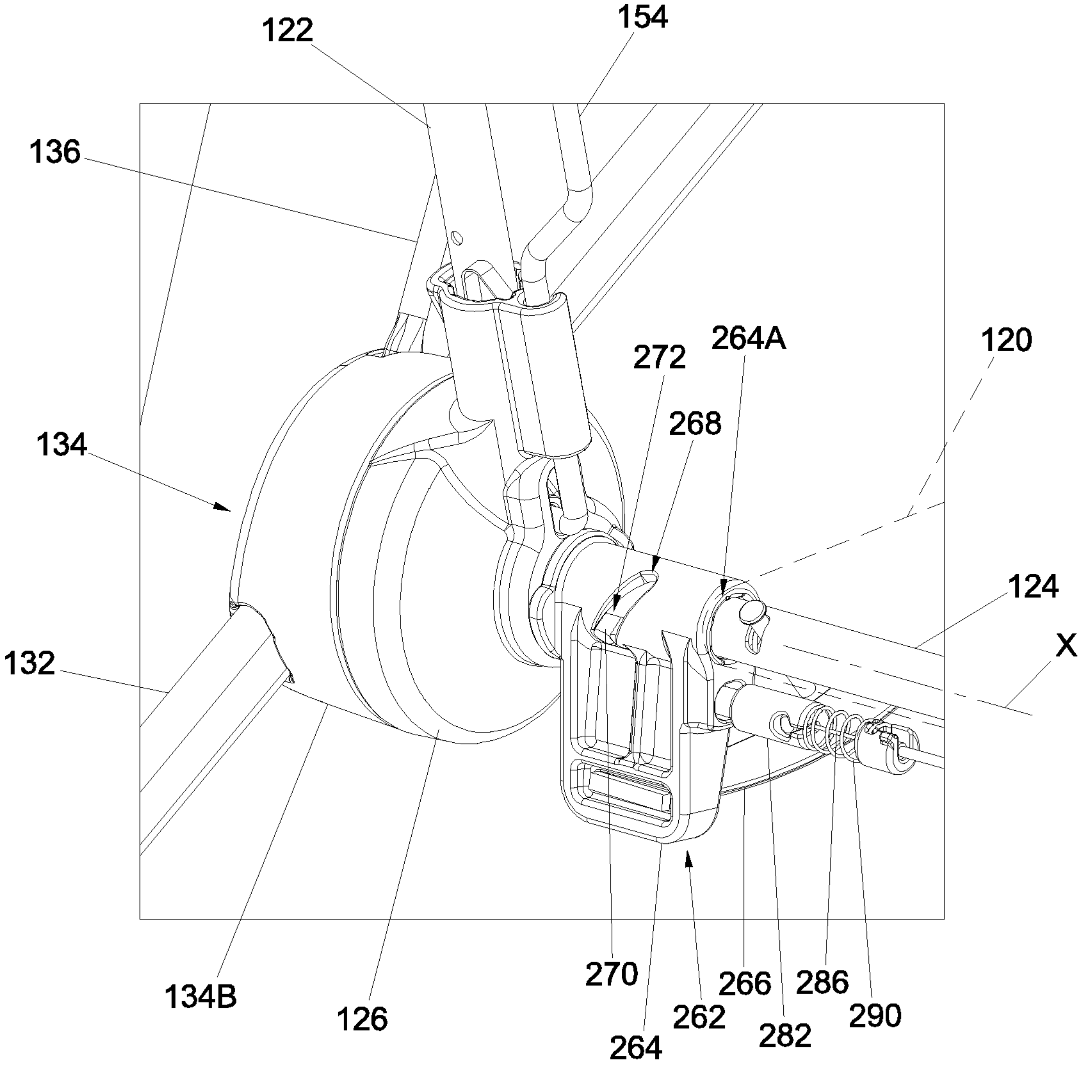
FIG. 24 is an enlarged view illustrating some construction details of the child stroller apparatus shown in FIG. 16.

FIGS. 16-30 are various views illustrating another embodiment of the child stroller apparatus 100. Referring to FIGS. 16-30, the child stroller apparatus 100 shown therein can have the same stroller frame 101 of the embodiment illustrated in FIGS. 1-5, which includes the two leg frames 102 and 104, the handle frame 106, the seat assembly 108 and the two linkages 110. Likewise, the seat assembly 108 includes the two seat portions 118 and 120 and the backrest frame 122, and each of the two linkages 110 includes the support bar 132, the slider 134 and the frame link 136. The assembly and operation of the leg frames 102 and 104, the handle frame 106, the seat portions 118 and 120, the backrest frame 122, the support bars 132, the sliders 134 and the frame links 136 can be similar to the embodiment of FIGS. 1-5, wherein each slider 134 can slide along the corresponding support bar 132, the shaft 124 (better shown in FIG. 24) is carried with the sliders 134 so as to be slidable along with the sliders 134 along the support bars 132, the backrest frame 122 is rotatable around the shaft 124 relative to the seat portion 120 and the sliders 134, and the seat portion 120 is also rotatable around the shaft 124 and the axis X relative to the backrest frame 122 and the sliders 134. In the embodiment of FIGS. 16-30, the two opposite ends of the shaft 124 can be respectively connected fixedly to the two sliders 134 so that the shaft 124 is fixed and does not move relative to the sliders 134. Like in the embodiment of FIGS. 1-5, relative rotation between the seat portions 118 and 120 is linked to sliding movement of the sliders 134 along the support bars 132 for folding and unfolding of the child stroller apparatus 100.

Referring to FIGS. 16-25, the child stroller apparatus 100 includes the backrest locking mechanism 144 (better shown in FIG. 25) configured to lock the backrest frame 122 to the slider 134 for preventing rotation of the backrest frame 122 relative to the slider 134. The backrest locking mechanism 144 can include the locking part 146, the resilient element 148 and the release actuator 150, which can be similar in construction and operation to the embodiment of FIGS. 1-6 described previously. Accordingly, the locking part 146 can slide along the shaft 124 and the axis X between the locking position where the locking part 146 engages with the pivot coupling portion 126 of the backrest frame 122 and the pivot coupling portion 134B of the slider 134 to prevent rotation of the backrest frame 122 relative to the slider 134, and the unlocking position where the locking part 146 disengages from the pivot coupling portion 126 of the backrest frame 122 for rotation of the backrest frame 122 relative to the slider 134. The resilient element 148 can apply an elastic force for biasing the locking part 146 toward the locking position. The release actuator 150 is connected to the locking part 146, and is operable to cause the locking part 146 to slide toward the unlocking position.

Referring to FIGS. 16-25, the child stroller apparatus 100 further includes a frame locking mechanism 256, which substitutes for the frame locking mechanism 156 of the previous embodiment shown in FIGS. 1-8. The frame locking mechanism 256 has a locking state and an unlocking state, wherein the frame locking mechanism 256 locks the slider 134 to the support bar 132 in the locking state, and allows sliding of the slider 134 along the support bar 132 in the unlocking state. Referring to FIGS. 16-25, the frame locking mechanism 256 can include a latch 258 movable to lock and unlock the slider 134 with respect to the support bar 132. According to an example of construction, the latch 258 is at least partially received inside the slider 134, and is movable relative to the slider 134 to engage with and disengage from the support bar 132. The latch 258 is engaged with the support bar 132 in the locking state to prevent the slider 134 from sliding relative to the support bar 132, whereby the child stroller apparatus 100 can be locked in the unfolded state. The latch 258 is disengaged from the support bar 132 in the unlocking state so that the slider 134 can slide along the support bar 132 for folding or unfolding the child stroller apparatus 100.

Figure 25:
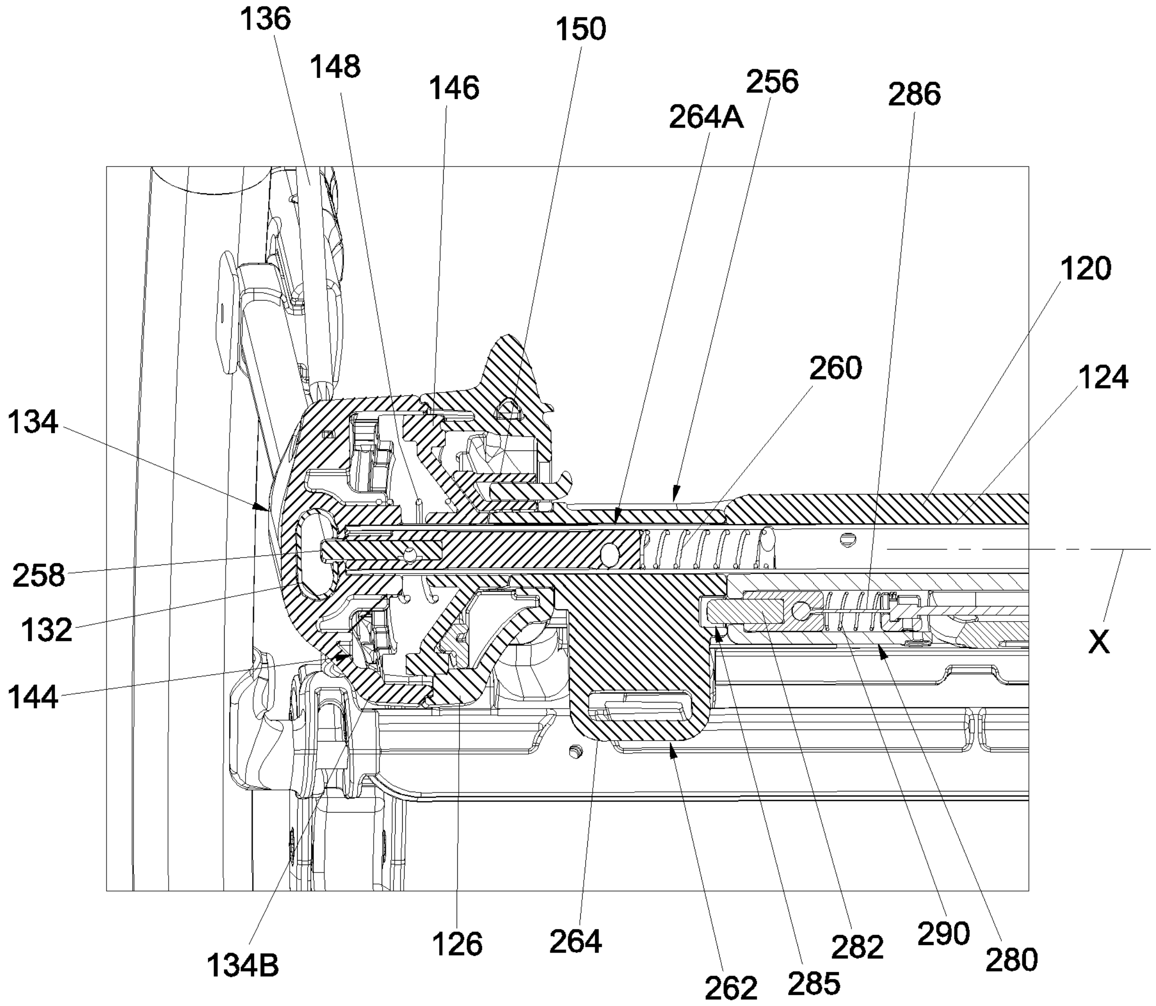
FIG. 25 is a cross-sectional view illustrating a connection region of a seat portion, a backrest frame and a slider in the child stroller apparatus shown in FIG. 16.
Figure 26:
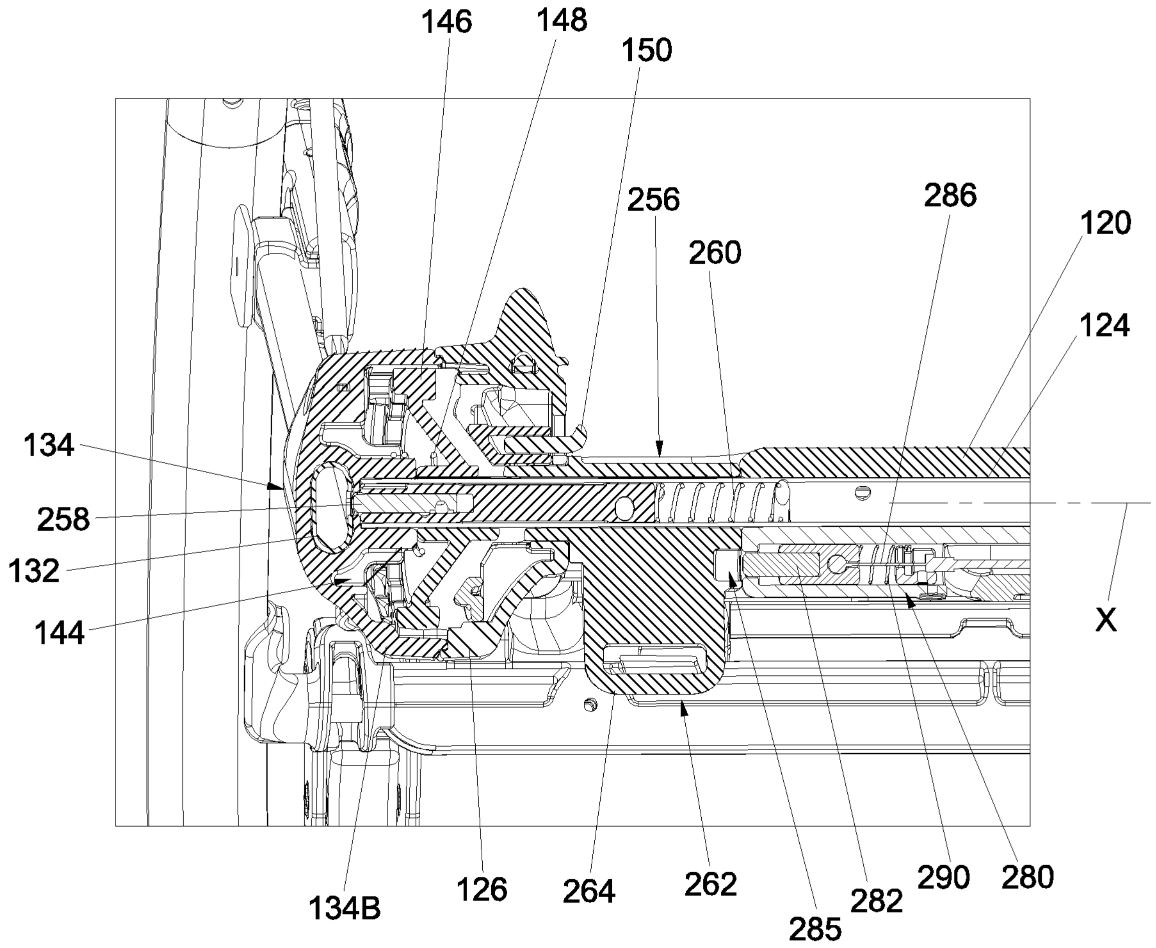
FIG. 26 is a cross-sectional view illustrating a frame locking mechanism in the child stroller apparatus of FIG. 16 in an unlocking state.

According to an example of construction, the latch 258 is configured to slide relative to the slider 134 for engaging with and disengaging from the support bar 132. More specifically, the shaft 124 can have a hollow interior, and the latch 258 can have an elongate portion that is disposed to slide along the hollow interior of the shaft 124 inside the slider 134. For example, the elongate portion of the latch 258 can be slidably connected to the shaft 124, whereby the latch 258 is slidable along the axis X relative to the shaft 124 and the slider 134 for engaging with and disengaging from the support bar 132. FIG. 25 shows the latch 258 in the locking state, and FIG. 26 shows the latch 258 in the unlocking state.

Referring to FIGS. 16 and 21-25, the frame locking mechanism 256 can further include a resilient element 260 and a latch actuator 262. The resilient element 260 can be disposed inside the shaft 124, and can be connected to the latch 258. According to an example of construction, the resilient element 260 can be a spring having two ends respectively connected to the latch 258 and an anchor structure provided inside the shaft 124. The resilient element 260 can apply an elastic force adapted to urge the latch 258 to slide for engaging with the support bar 132.

The latch actuator 262 is connected to the latch 258, and is operable to cause the latch 258 to move relative to the slider 134 for disengaging from the support bar 132. According to an example of construction, the latch actuator 262 and the latch 258 are configured to move in a concurrent manner to cause the latch 258 to engage with and disengage from the support bar 132, and a caregiver can operate the latch actuator 262 to switch the frame locking mechanism 256 to the unlocking state.

Referring to FIGS. 16-26, the latch actuator 262 can be disposed adjacent to the axis X. The latch actuator 262 can extend from an underside of the seat assembly 108 to an upper side of the seat assembly 108, and is operable to cause the latch 258 to disengage from the support bar 132 and to cause the seat portions 118 and 120 to fold toward each other. The latch actuator 262 can include a driving part 264 and an operating part 266. According to an example of construction, the latch actuator 262 has at least a portion configured to be rotatable about the axis X. For example, the driving part 264 is connected to the latch 258, and is rotatable about the axis X for urging the latch 258 to disengage from the support bar 132. According to an example of construction, the driving part 264 can be pivotally connected about the shaft 124 which extends along the axis X, whereby the driving part 264 is rotatable about the axis X relative to the shaft 124. For example, the driving part 264 can be a single component part having a hole 264A, and the shaft 124 can be disposed through the hole 264A so that the driving part 264 can rotate around the shaft 124. The driving part 264 is connected to the latch 258 so that a rotation of the driving part 264 about the axis X can urge the latch 258 to slide along the axis X and disengage from the support bar 132. According to an example of construction, the latch 258 is slidably connected to the driving part 264 so that the latch 258 and the driving part 264 are movably linked to each other, i.e., sliding of the latch 258 along the axis X and rotation of the driving part 264 about the axis X occur concurrently. For example, the driving part 264 can have a guide slot 268, and a portion of the latch 258 extending inside the shaft 124 can have a pin 270 that protrudes outward through a slot 272 on the shaft 124 and is slidably connected through the guide slot 268 of the driving part 264. The pin 270 is fixedly connected to the latch 258, e.g., by fastening the pin 270 to the latch 258 or by having the pin 270 formed integrally with the latch 258 as a single body. The slot 272 of the shaft 124 can be an elongate slot extending generally along the axis X, and the guide slot 268 of the driving part 264 at least partially overlaps with and is tilted an angle relative to the slot 272 of the shaft 124. According to an example of construction, the guide slot 268 of the driving part 264 can include, without limitation, a helicoidal slot. Through the sliding connection between the guide slot 268 and the pin 270, a sliding movement of the latch 258 along the axis X in a locking direction (i.e., for engaging with the support bar 132) corresponds to a rotation of the driving part 264 about the axis X in one direction, and a sliding movement of the latch 258 along the axis X in an unlocking direction (i.e., for disengaging from the support bar 132) corresponds to a rotation of the driving part 264 about the axis X in another opposite direction.

The operating part 266 is connected to the driving part 264, and is operable to urge the driving part 264 to rotate and cause the latch 258 to disengage from the support bar 132. According to an example of construction, the operating part 266 can be a flexible strip, which may include, without limitation, an operating strap. As shown in FIGS. 16-18, 20-22 and 24, the operating part 266 can extend through the seat assembly 108 from an underside thereof to an upper side thereof at a location forward of the axis X. For example, the seat portion 120 of the seat assembly 108 can have an opening 274 at a location forward of the axis X, and the operating part 266 can extend from the underside of the seat portion 120 through the opening 274 to the upper side of the seat portion 120. The operating part 266 is configured so as to provide convenient unlocking and folding operation: a caregiver can pull the operating part 266 upward at the upper side of the seat portion 120 to cause the driving part 264 to rotate and thereby urge the latch 258 to disengage from the support bar 132, and further lift the child stroller apparatus 100 for its folding. Because the operating part 266 extends along a rear-to-front direction at the underside of the seat assembly 108, pulling the operating part 266 upward can result in the application of a forward force on the shaft 124, which can assist in displacing the seat portion 120 and the sliders 134 in the folding direction.

Figure 27:
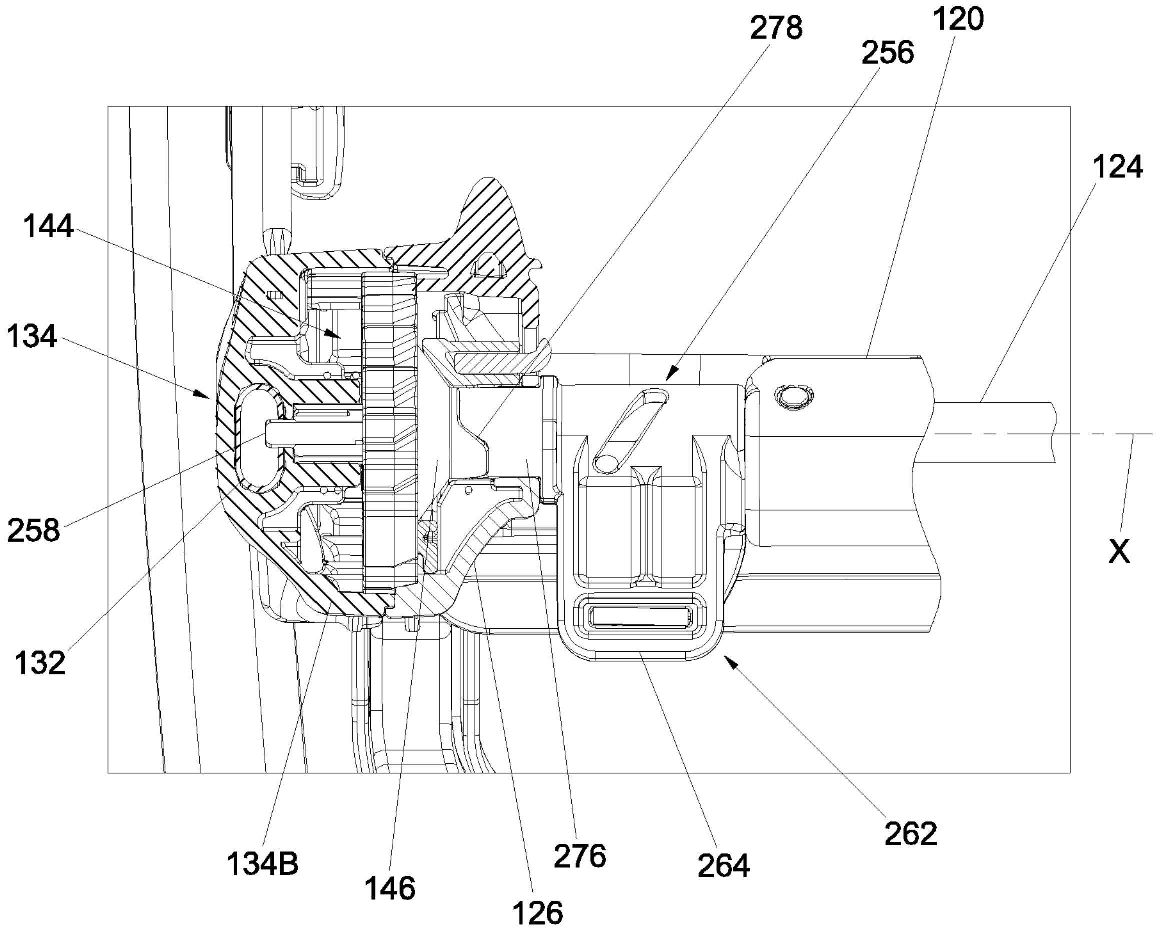
FIG. 27 is a partial cross-sectional view illustrating further construction details of a driving part inside a pivot coupling portion of the backrest frame in the child stroller apparatus of FIG. 16.
Figure 28:
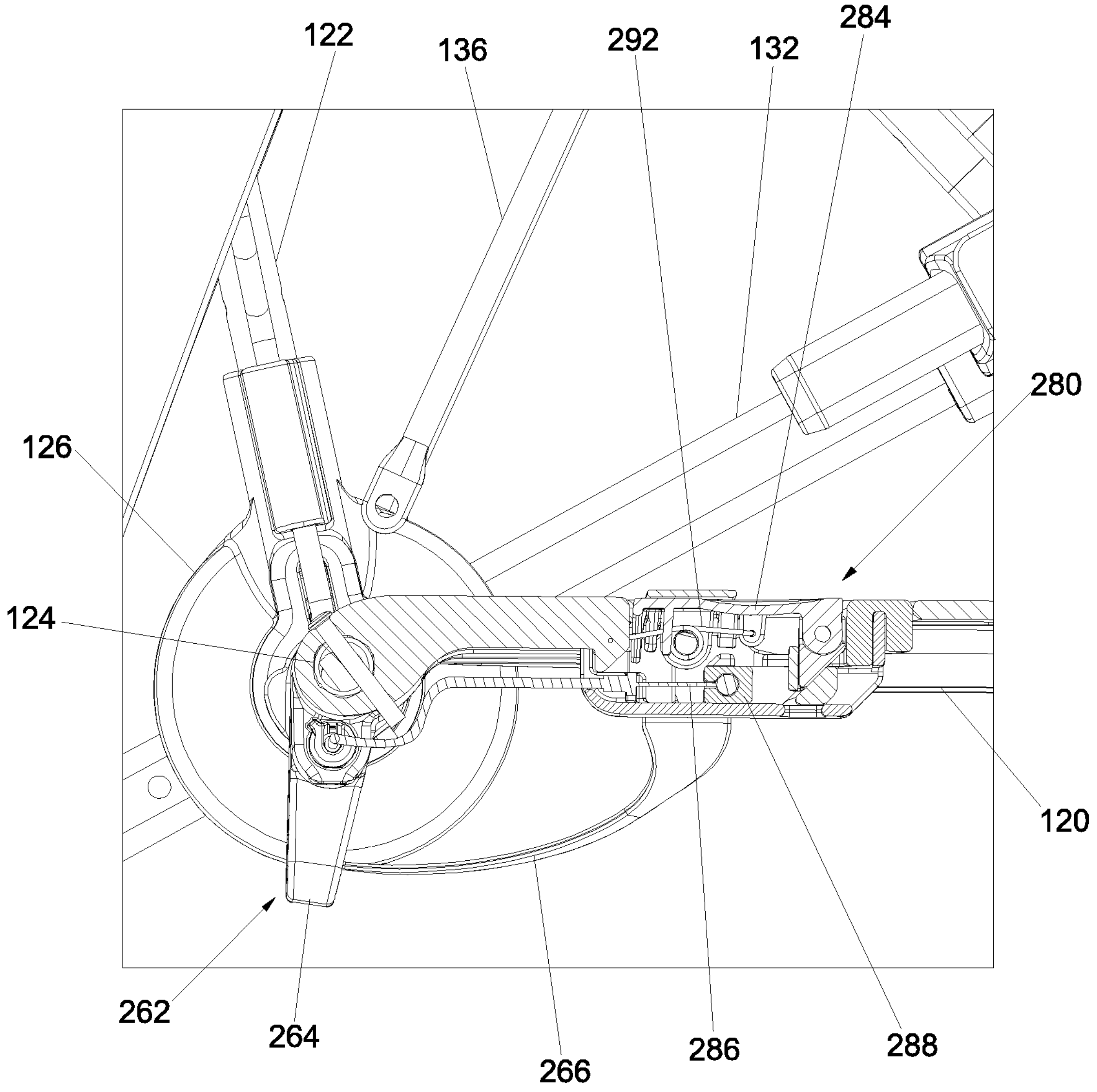
FIG. 28 is a cross-sectional view illustrating some construction details of a safety lock mechanism provided in the child stroller apparatus of FIG. 16.

In conjunction with FIG. 25, FIG. 27 is a partial cross-sectional view illustrating further construction details of the driving part 264 inside the pivot coupling portion 126 of the backrest frame 122. Referring to FIGS. 25 and 27, the driving part 264 can further have an abutting portion 276, which can be in sliding contact with the locking part 146 of the backrest locking mechanism 144. The abutting portion 276 may be exemplarily connected fixedly to the driving part 264 at a distal end thereof, whereby the abutting portion 276 is rotatable along with the driving part 264 about the axis X. As shown in FIG. 27, the sliding contact between the abutting portion 276 and the locking part 146 can be achieved through a ramp surface 278, whereby the driving part 264 and the abutting portion 276 are concurrently rotatable about the axis X to urge the locking part 146 to slide toward the unlocking position. As a result, when a caregiver operates the latch actuator 262 for switching the frame locking mechanism 256 to the unlocking state, the locking part 146 can be concurrently urged by the abutting portion 276 of the latch actuator 262 to slide toward the unlocking position. Accordingly, the backrest locking mechanism 144 can be conveniently unlocked without the need of operating the release actuator 150 thereof, which allows rotation of the backrest frame 122 about the axis X for reducing the volume of the child stroller apparatus 100.

According to an example of construction, the latch 258, the resilient element 260 and the driving part 264 described previously can be provided at each of the left and right side of the seat assembly 108, and the operating part 266 can extend transversally at the upper side of the seat portion 120 and connect to the two driving parts 264 at the left and right side of the seat assembly 108. The operating part 266 is thereby operable to cause the two latches 258 at the left and right side to move concurrently for engaging with or disengaging from the corresponding support bars 132, and to further urge the two locking parts 146 at the left and right side to concurrently unlock.

Figure 29:
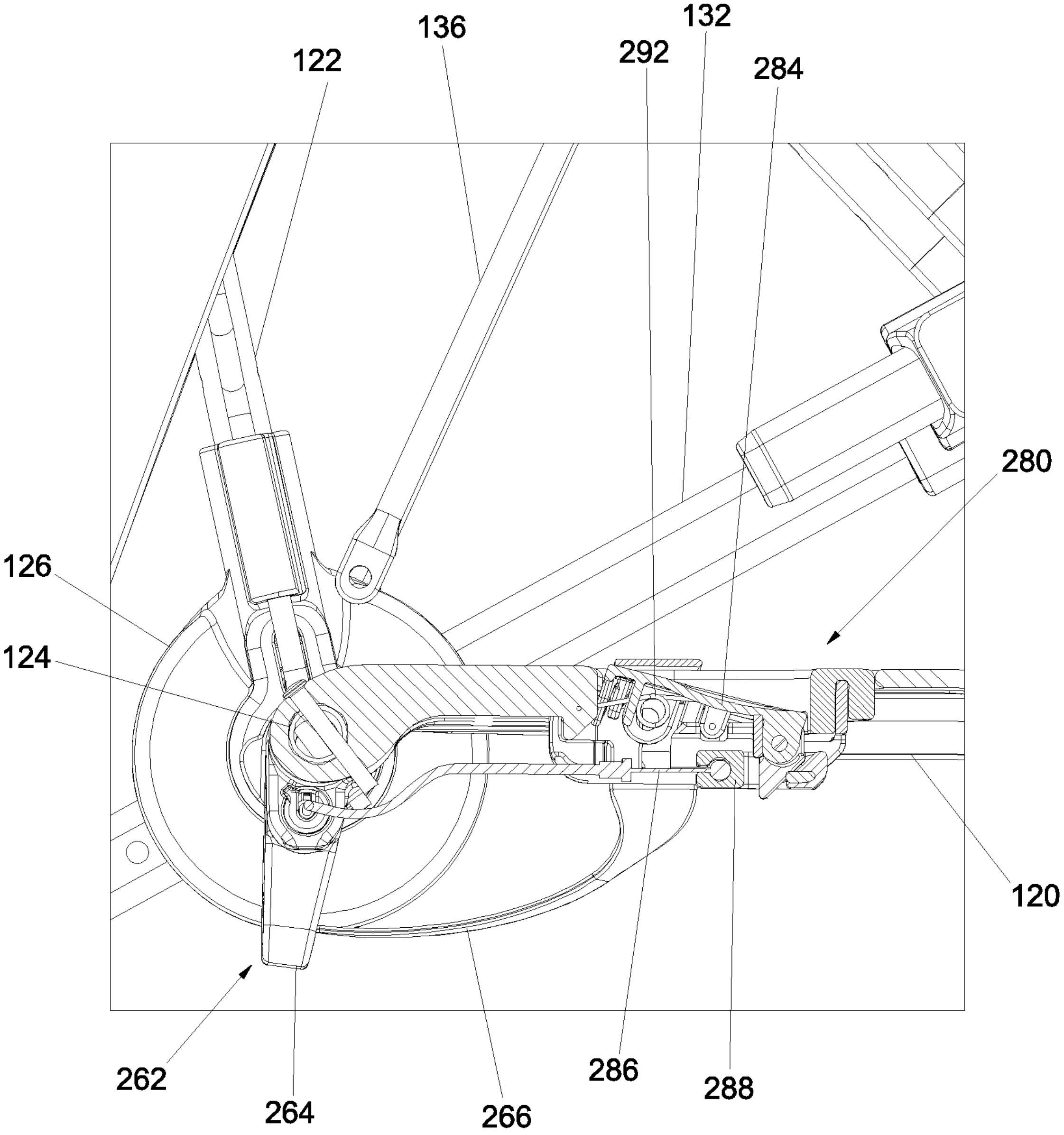
FIG. 29 is a cross-sectional view illustrating the safety lock mechanism of FIG. 28 in an unlocking state.

Referring to FIGS. 21, 22, 24-26, 28 and 29, the child stroller apparatus 100 can further include a safety lock mechanism 280 configured to prevent accidental unlocking of the latch 258. The safety lock mechanism 280 can include an impeding part 282 and a releasing part 284 connected to each other. The impeding part 282 can engage with the driving part 264 to prevent a rotation of the driving part 264 that causes the latch 258 to switch from the locking state to the unlocking state. The releasing part 284 is operable to urge the impeding part 282 to disengage from the driving part 264, whereby the driving part 264 is allowed to rotate about the axis X for urging the latch 258 to switch from the locking state to the unlocking state. For facilitating the engagement of the impeding part 282 with the driving part 264, the driving part 264 can have an opening 285, and the impeding part 282 can engage with the opening 285 to prevent the driving part 264 from rotating about the axis X. According to an example of construction, the impeding part 282 and the releasing part 284 can be assembled with the seat portion 120, wherein the impeding part 282 can be disposed adjacent to the driving part 264, and the releasing part 284 can be exposed on an upper surface of the seat portion 120 for operation by a caregiver. The impeding part 282 and the releasing part 284 are movably connected to the seat portion 120, e.g., the impeding part 282 can be slidably connected to the seat portion 120, and the releasing part 284 can be pivotally connected to the seat portion 120. The impeding part 282 and the releasing part 284 may be connected to each other via a cable. For example, the safety lock mechanism 280 can include a cable 286 and a cable actuator 288. The cable 286 can have two opposite ends respectively connected to the impeding part 282 and the cable actuator 288, and the cable actuator 288 can be disposed adjacent to the releasing part 284. As shown in FIGS. 26 and 29, the releasing part 284 can be pressed to urge the cable actuator 288 to move and pull the impeding part 282 through the cable 286, which causes the impeding part 282 to disengage from the driving part 264. The driving part 264 is thereby allowed to rotate about the axis X for urging the latch 258 to switch from the locking state to the unlocking state.

The impeding part 282 can further be connected to a resilient element 290. When no external force is applied on the releasing part 284, the resilient element 290 can apply an elastic force that assists the impeding part 282 in recovering an engagement state with respect to the driving part 264. The releasing part 284 can also be connected to another resilient element 292, which can apply an elastic force adapted to assist the releasing part 284 in recovering an initial position when no external force is applied on the releasing part 284.

Reference is made hereinafter to FIGS. 16-30 for describing a folding operation of the child stroller apparatus 100. Referring to FIGS. 16-25, when the child stroller apparatus 100 is in the unfolded state, the slider 134 is located adjacent to the location where the support bar 132 pivotally connects to the side segment 104A of the leg frame 104, the seat portions 118 and 120 extend generally along a same plane, and the frame locking mechanism 256 is in the locking state so that the child stroller apparatus 100 can be locked in the unfolded state.

Figure 30:
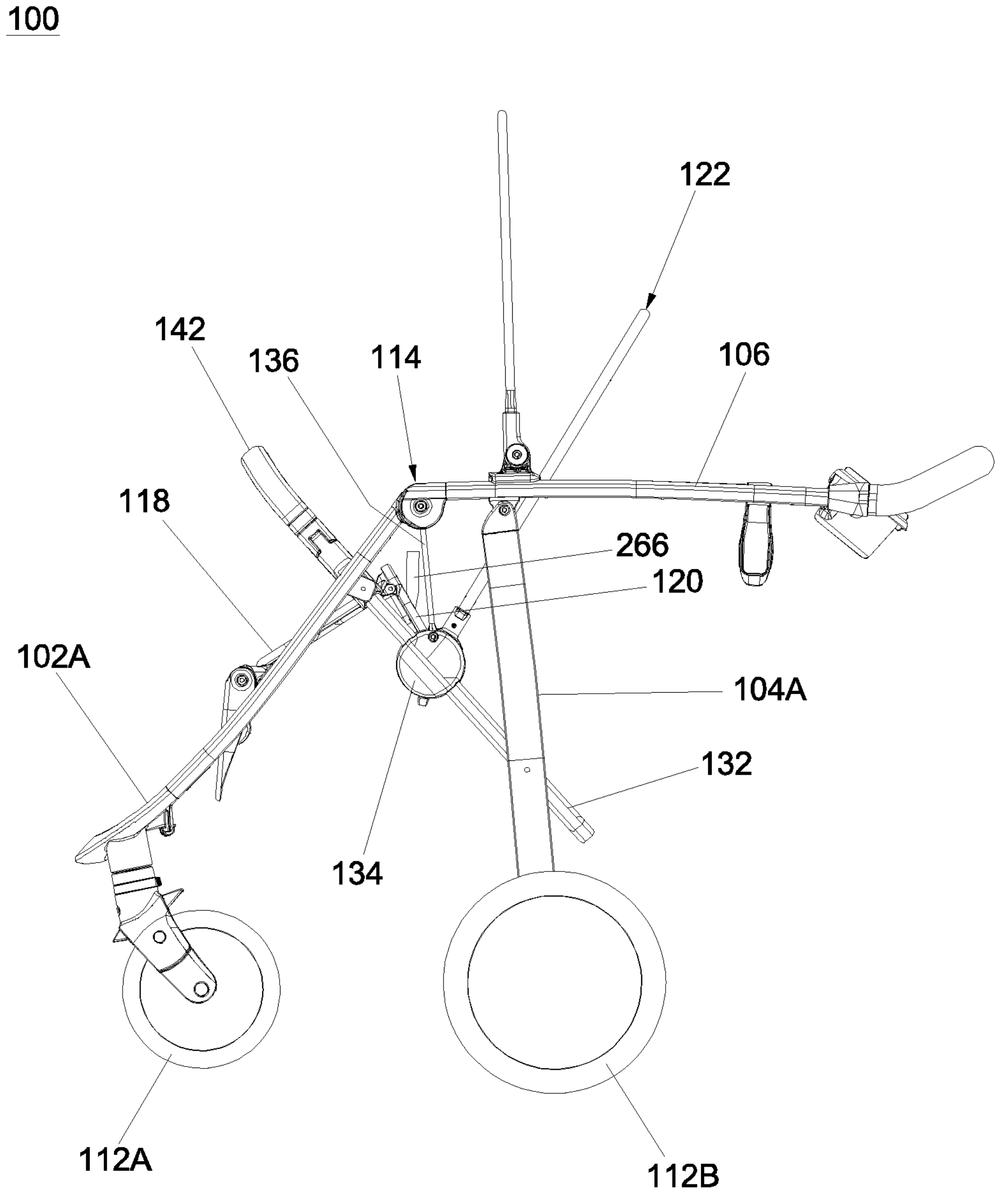
FIG. 30 is a side view illustrating exemplary folding operation of the child stroller apparatus shown in FIG. 16.
Figure 31:
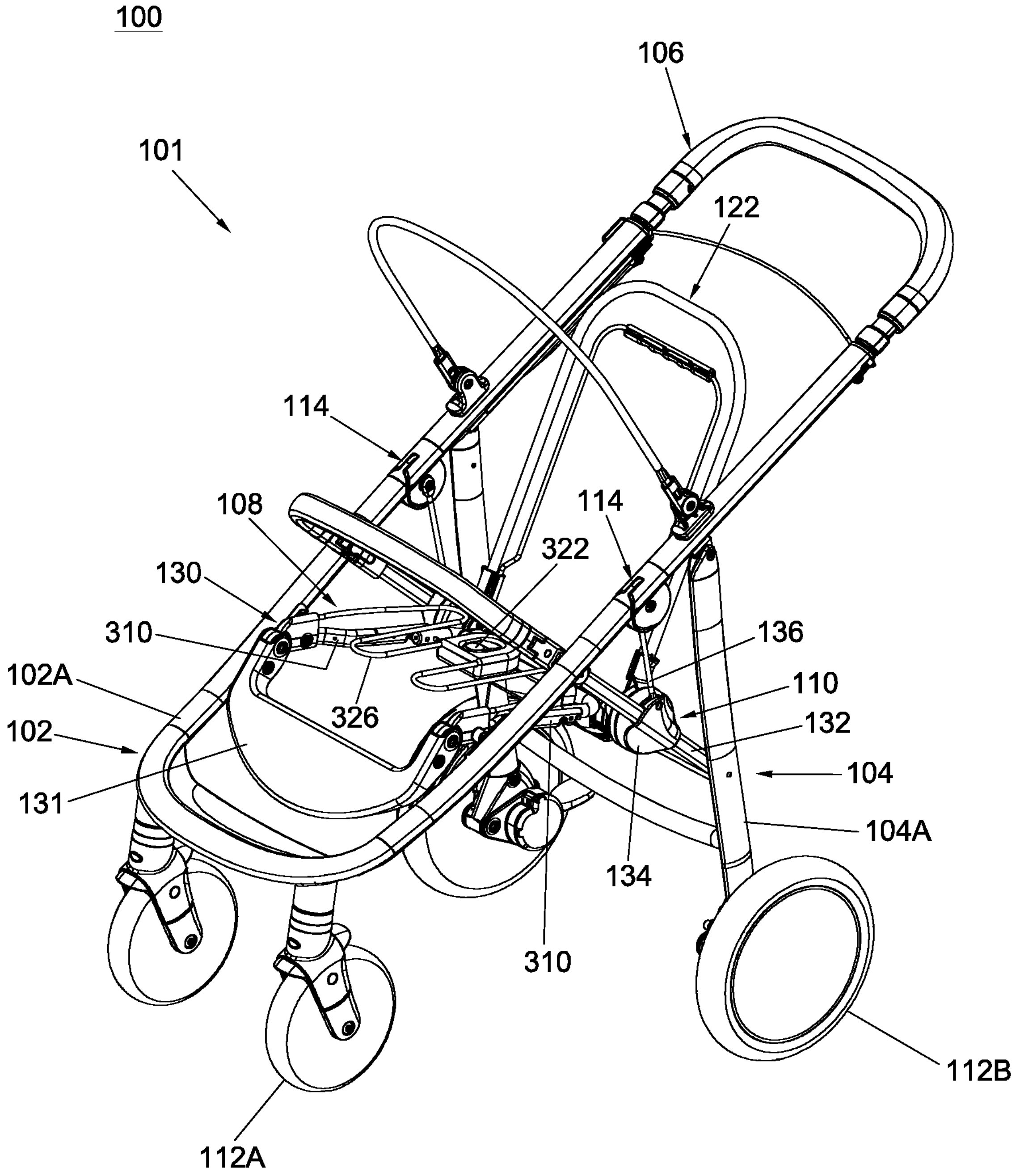
FIG. 31 is a perspective view illustrating a variant embodiment of the child stroller apparatus shown in FIGS. 16-30.
Figure 32:
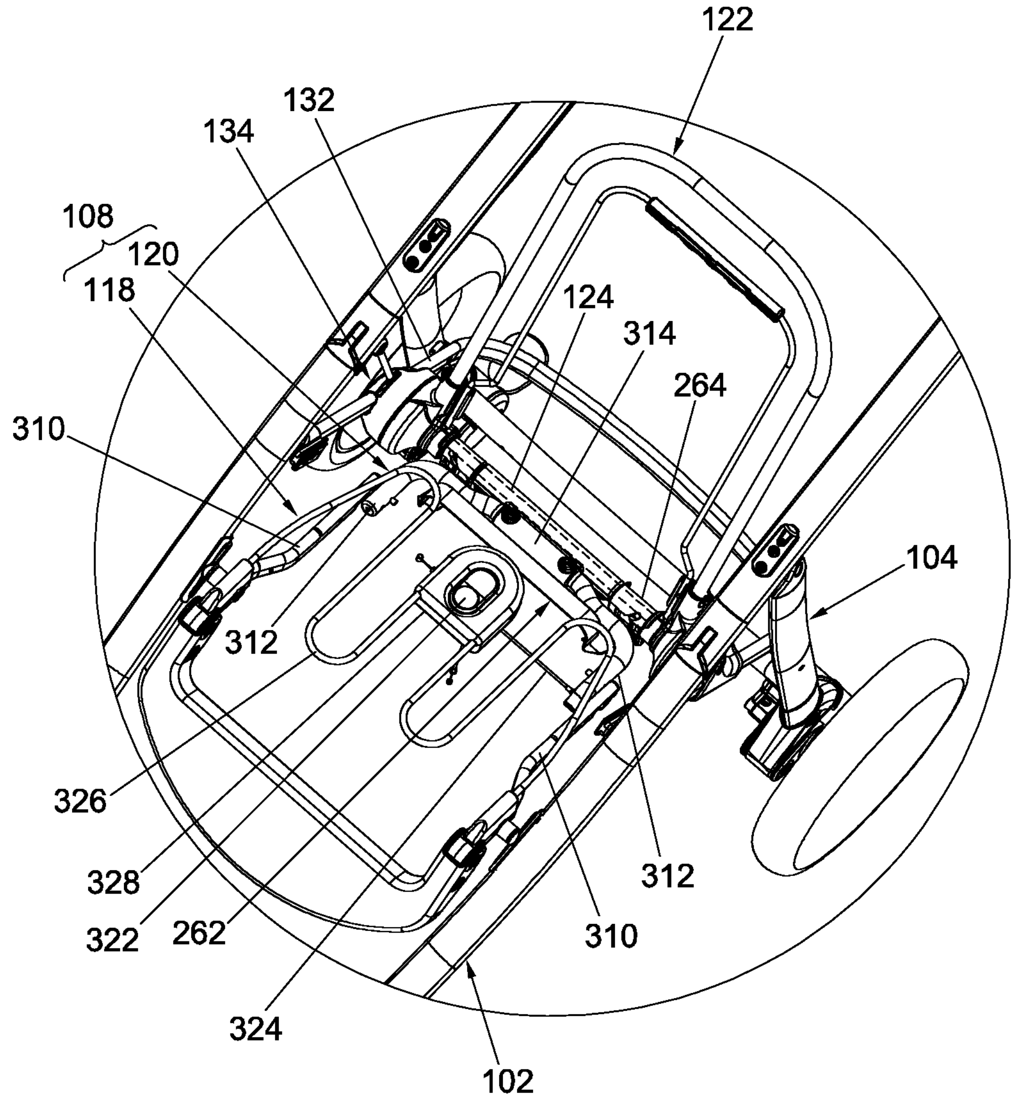
FIG. 32 is an enlarged view of a portion of the child stroller apparatus shown in FIG. 31.
Figure 33:
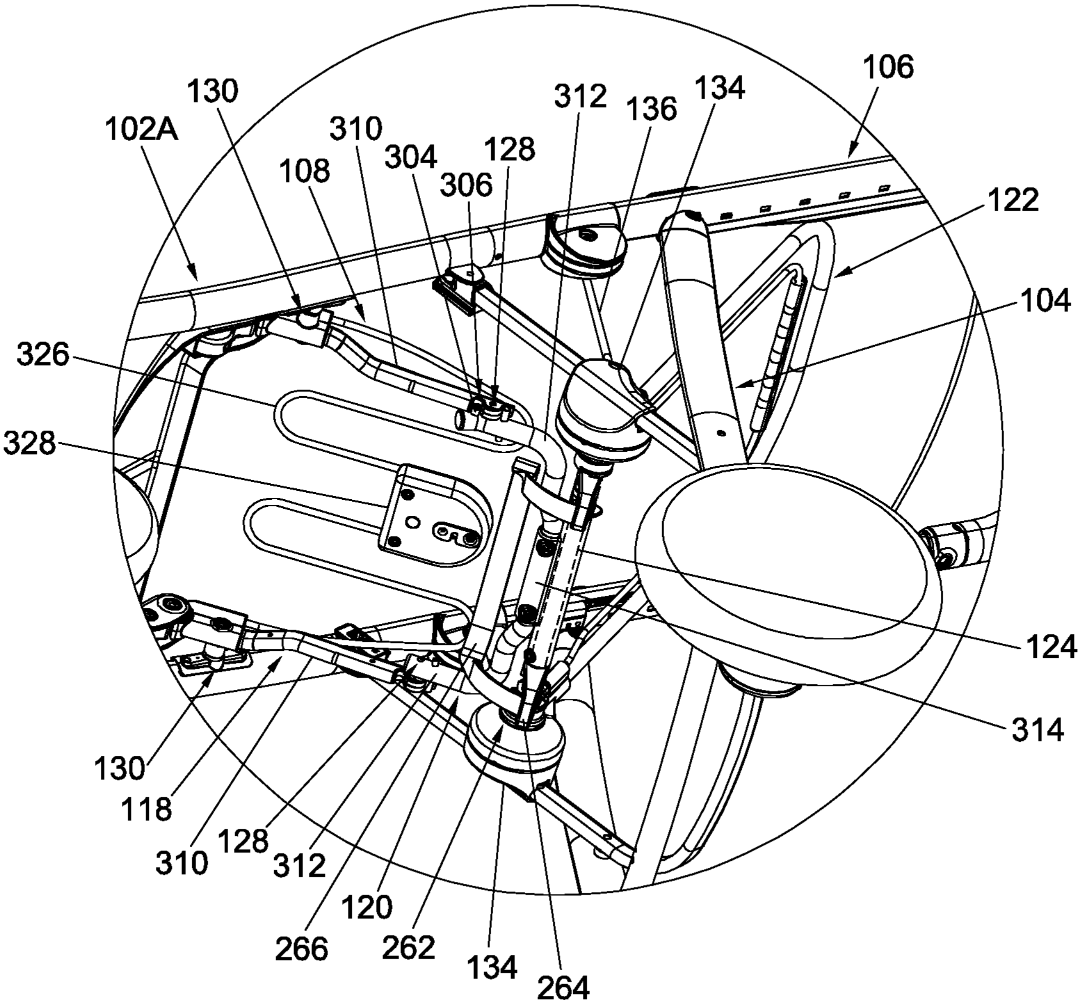
FIG. 33 is an enlarged bottom view of a portion of the child stroller apparatus shown in FIG. 31.

For folding the child stroller apparatus 100, a caregiver can press the releasing part 284 for unlocking the safety lock mechanism 280. Then the operating part 266 can be manually grasped and pulled upward to switch the frame locking mechanism 256 to the unlocking state. The pulling action applied through the operating part 266 can also pull the shaft 124 and the sliders 134 forward, which causes each slider 134 to slide along the corresponding support bar 132 away from the location where the support bar 132 pivotally connects to the side segment 104A of the leg frame 104. As a result, the seat portions 118 and 120 can fold toward each other, and the leg frames 102 and 104 and the handle frame 106 can be urged to move and fold through the coupling of the frame link 136 to the slider 134 at each of the left and right side, as shown in FIG. 30. When the child stroller apparatus 100 is fully folded, the support bar 132 can be folded toward the side segment 104A of the leg frame 104, and the slider 134 can be located adjacent to the location where the support bar 132 pivotally connects to the side segment 102A of the leg frame 102. The child stroller apparatus 100 may also be provided with the fastener 184 illustrated in FIG. 12, which can engage with the slider 134 for holding the child stroller apparatus 100 in the folded state.

FIGS. 31-41 illustrate a variant embodiment of the child stroller apparatus 100 shown in FIGS. 16-30. Referring to FIGS. 31-41, the child stroller apparatus 100 shown therein can generally have the same stroller frame 101 described previously, which includes the two leg frames 102 and 104, the handle frame 106, the seat assembly 108 and the two linkages 110. Likewise, the seat assembly 108 includes the two seat portions 118 and 120 and the backrest frame 122, and each of the two linkages 110 includes the support bar 132, the slider 134 and the frame link 136. The seat portion 118 can include two bar segments 310 at the left and right side, and the seat portion 120 can also include two bar segments 312 at the left and right side that are respectively connected pivotally to the two bar segments 310 via two articulations 128. The two bar segments 310 of the seat portion 118 can be respectively connected pivotally to the two side segments 102A of the leg frame 102 via two articulations 130, and the two bar segments 312 of the seat portion 120 can be pivotally connected to the shaft 124 via a bracket 314. Moreover, the seat portions 118 and 120 may further include other elements, e.g., seat pans or softgoods elements (not shown), which can be connected to the bar segments 310 and 312 so that the seat portions 118 and 120 can provide seating support for a child. The assembly and operation of the leg frames 102 and 104, the handle frame 106, the seat portions 118 and 120, the backrest frame 122, the support bars 132, the sliders 134 and the frame links 136 can be similar to the embodiments of FIGS. 1-5 and 16-30, wherein relative rotation between the seat portions 118 and 120 is linked to sliding movements of the slider 134 along the support bar 132 at each of the left and right side for folding and unfolding of the child stroller apparatus 100. Like in the previous embodiment, the child stroller apparatus 100 of FIGS. 31-41 can be provided with the latch actuator 262 including the driving part 264 and the operating part 266, which is operable to cause the frame locking mechanism 256 (better shown in FIGS. 25-27) to switch to the unlocking state for folding of the child stroller apparatus 100.

Referring to FIGS. 31-38, the child stroller apparatus 100 can further include a safety lock mechanism 302, which is operable independently of the frame locking mechanism 256 (better shown in FIGS. 25-27), and is configured to prevent accidental folding of the seat portions 118 and 120. The safety lock mechanism 302 includes a lock 304, and has a locking state and an unlocking state. The lock 304 creates an obstacle on a travel path of the seat portions 118 and 120 in the locking state that prevents relative rotation between the seat portions 118 and 120 from the unfolded state toward the folded state, and removes the obstacle in the unlocking state to allow relative rotation between the seat portions 118 and 120 from the unfolded state toward the folded state. According to an example of construction, the lock 304 can be movably assembled with the seat portion 120 adjacent to the articulation 128, and is movable to engage with and disengage from the seat portion 118. For example, while the seat portions 118 and 120 are in the unfolded state, the lock 304 can engage with a recess 306 provided in the seat portion 118 to prevent relative rotation between the seat portions 118 and 120 toward the folded state. The safety lock mechanism 302 can be switched to the unlocking state by disengaging the lock 304 from the recess 306 of the seat portion 118, which allows relative rotation between the seat portions 118 and 120 from the unfolded state toward the folded state.

Referring to FIGS. 31-38, the recess 306 may be exemplarily provided on each of the two bar segments 310 of the seat portion 118. The lock 304 can be movably disposed in a hollow interior of one of the two bar segments 312 adjacent to the articulation 128, and is movable to protrude outside the bar segment 312 or retract toward the interior of the bar segment 312.

The safety lock mechanism 302 can further include a resilient element 320 connected to the lock 304. The resilient element 320 is disposed inside the bar segment 312 that carries the lock 304, and is respectively connected to the lock 304 and an inner sidewall of the bar segment 312. According to an example of construction, the lock 304 can have a cavity 304A, and the resilient element 320 can include a spring extending into the cavity 304A, two ends of the spring being respectively connected to an inner sidewall of the cavity 304A and the inner sidewall of the bar segment 312. The resilient element 320 can apply an elastic force that biases the lock 304 to move and protrude outside the bar segment 312 for engaging with the recess 306 of the bar segment 310.

It will be appreciated that the assembly of the lock 304 and the resilient element 320 is not limited to the aforementioned example. Alternatively, the lock 304 and the resilient element 320 may be disposed in the bar segment 310, the lock 304 being movable to engage with and disengaging from a recess provided on the bar segment 312 for locking and unlocking of the safety lock mechanism 302.

To facilitate the unlocking operation of the lock 304, the safety lock mechanism 302 can further include a release actuator 322 and a linking part 324. The release actuator 322 can be exemplarily carried with the seat portion 118, and can be connected to the lock 304 via the linking part 324. According to an example of construction, the seat portion 118 can include a resilient wire assembly 326 having two ends respectively affixed to the two bar segments 310, and the release actuator 322 can be disposed on the resilient wire assembly 326. The resilient wire assembly 326 is adapted to provide seating support, and can elastically move upward and downward. The release actuator 322 can be disposed at any suitable locations on the resilient wire assembly 326. For example, a central region of the resilient wire assembly 326 can be provided with a housing 328 fixedly connected thereto, and the release actuator 322 can include a button pivotally connected to the housing 328. According to other examples of construction, the release actuator 322 may be an element slidably connected and/or pivotally connected to to the housing 328. The linking part 324 can include a cable having an end 324A connected to the release actuator 322 and another end 324B connected to the lock 304. Accordingly, the release actuator 322 is operable to urge the lock 304 to move through the linking part 324, which causes the lock 304 to disengage from the recess 306 of the bar segment 310. According to an example of construction, the same assembly of the lock 304 and the resilient element 320 can be provided in each of the two bar segments 312 (or bar segments 310), and the release actuator 322 can be respectively connected to the two locks 304 via two linking parts 324.

Figure 37:
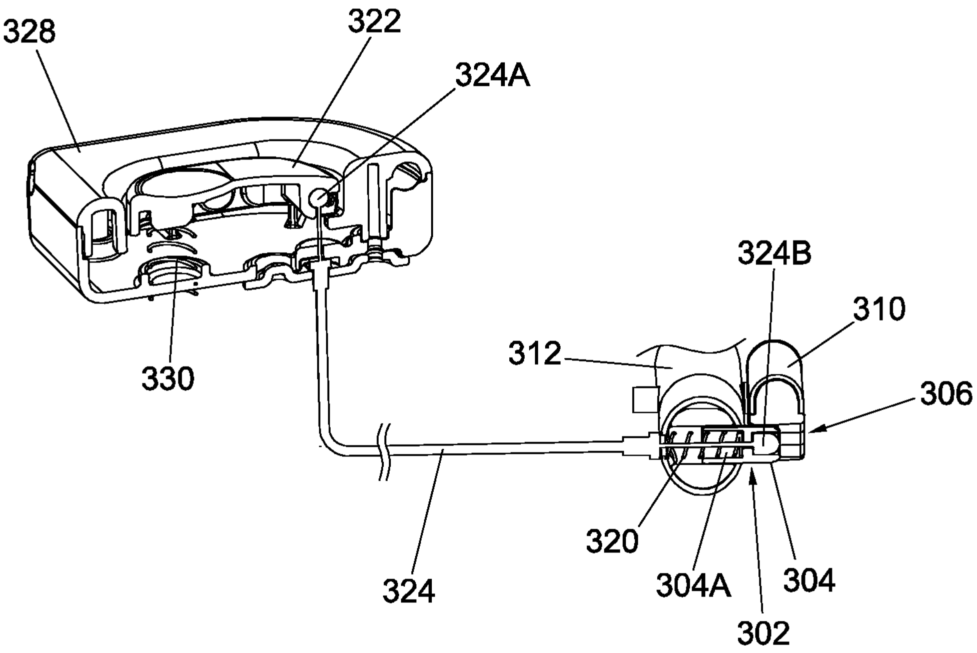
FIG. 37 is a cross-sectional view illustrating a safety lock mechanism provided in the child stroller apparatus of FIG. 31.
Figure 38:
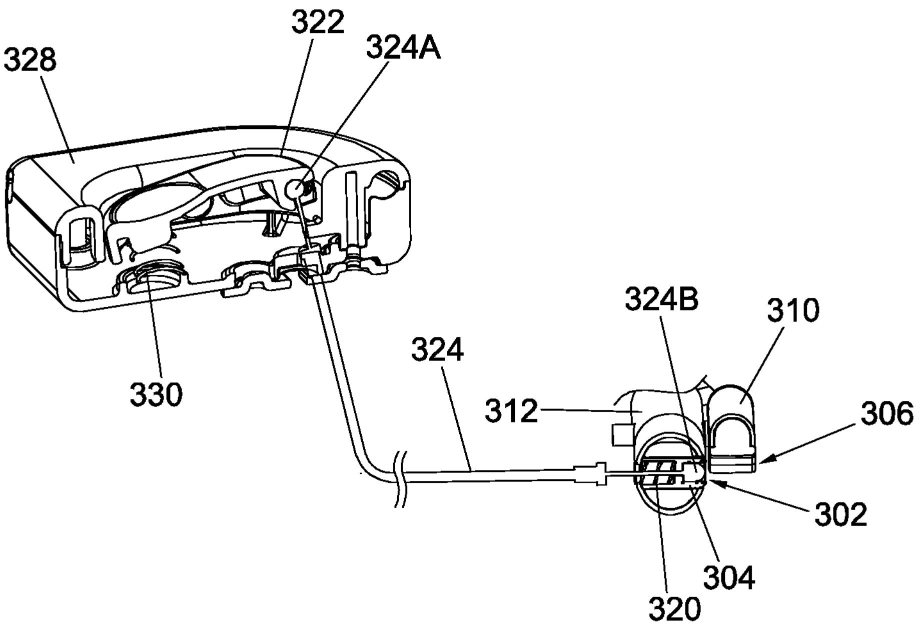
FIG. 38 is a cross-sectional view illustrating the safety lock mechanism of FIG. 36 in an unlocking state.

Referring to FIGS. 37 and 38, the release actuator 322 can be connected to a resilient element 330 (e.g., a spring), which is disposed inside the housing 328. The resilient element 330 applies an elastic force that can bias the release actuator 322 toward an initial position. A caregiver can push the release actuator 322 to cause the lock 304 to disengage from the recess 306 of the bar segment 310, which switches the safety lock mechanism 302 to the unlocking state. When the caregiver releases the release actuator 322, the release actuator 322 can recover its initial position under the biasing action of the resilient element 330.

Figure 39:
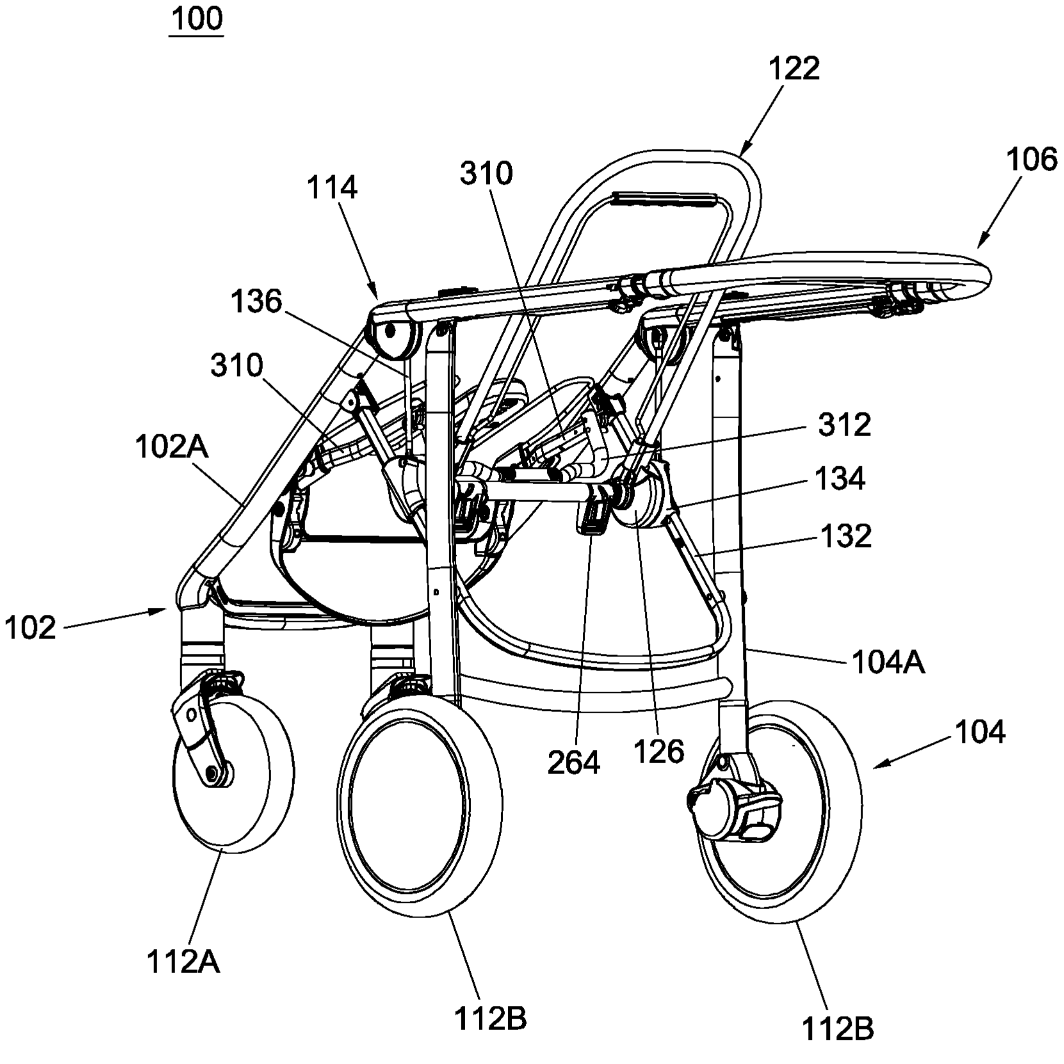
FIG. 39 is a perspective view illustrating exemplary folding of the child stroller apparatus shown in FIG. 31.
Figure 40:
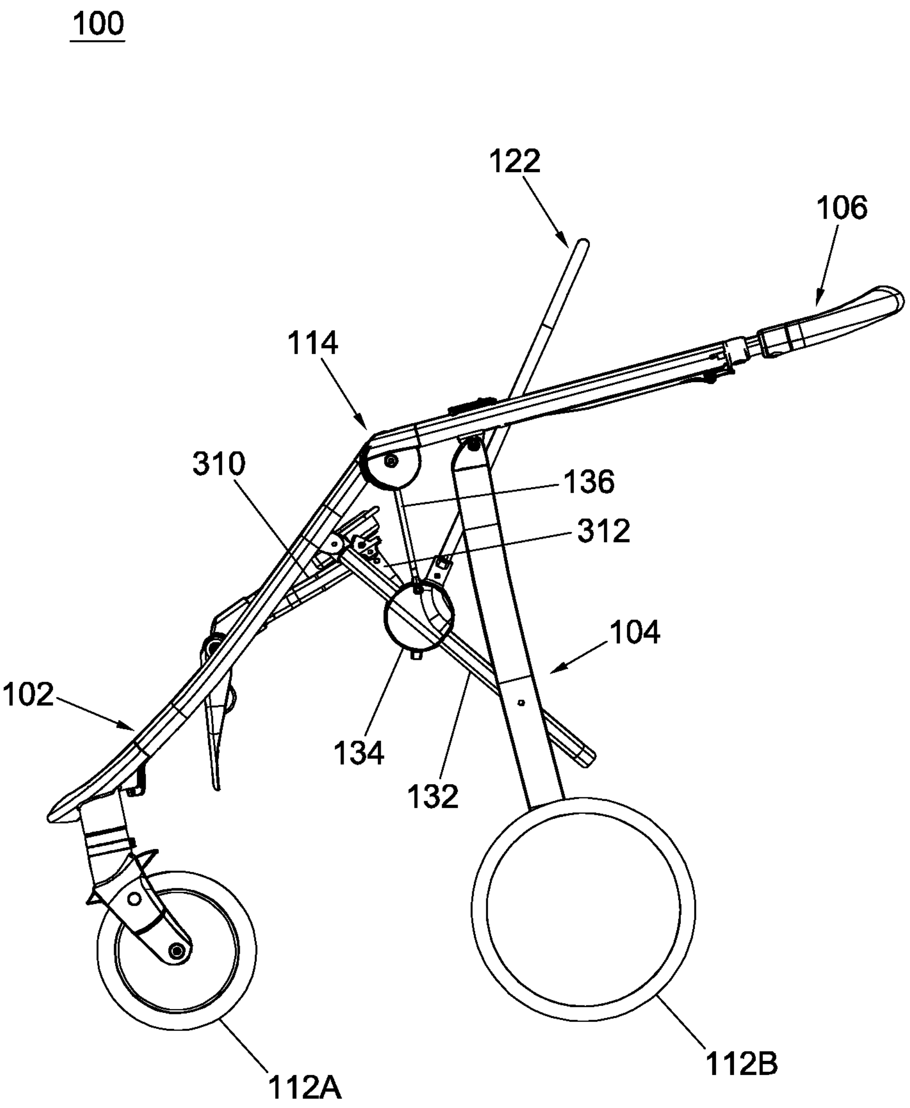
FIG. 40 is a side view illustrating exemplary folding of the child stroller apparatus shown in FIG. 31.
Figure 41:
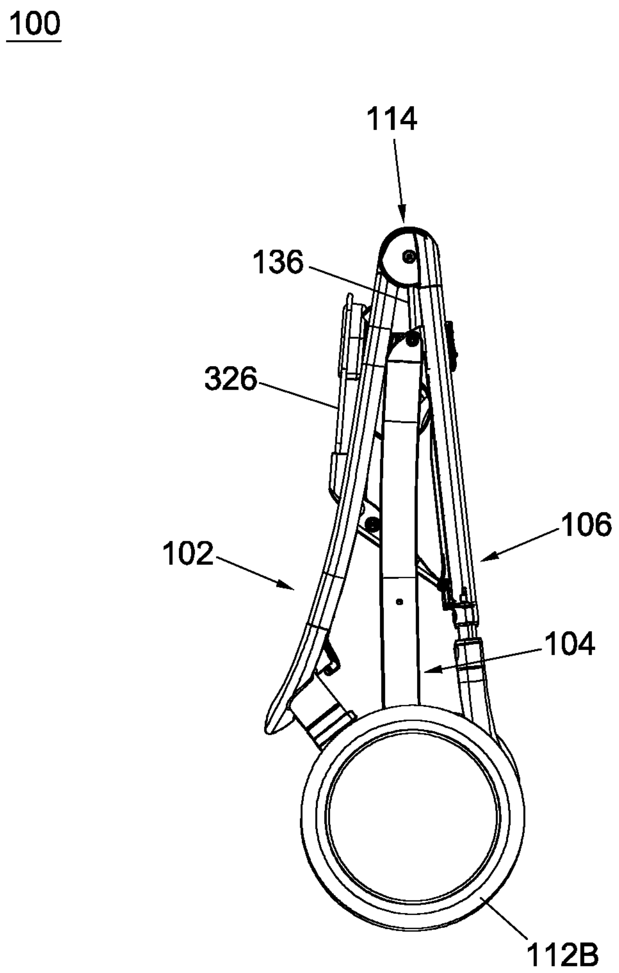
FIG. 41 is a side view illustrating the child stroller apparatus of FIG. 31 in a fully folded state.

In conjunction with FIGS. 31-38, FIGS. 39-41 illustrate exemplary folding of the child stroller apparatus 100. For folding the child stroller apparatus 100, a caregiver can respectively operate the release actuator 322 of the safety lock mechanism 302 and the latch actuator 262 of the frame locking mechanism, whereby the seat portions 118 and 120 are allowed to rotate toward the folded state and the slider 134 at each of the left and right side is allowed to slide along the corresponding support bar 132. Then the child stroller apparatus 100 can be lifted above a floor with the latch actuator 262, which causes folding of the child stroller apparatus 100 as shown in FIGS. 39-41. Once the child stroller apparatus 100 is fully folded, the leg frame 102 and the handle frame 106 can be respectively folded to generally lie at two opposite sides of the leg frame 104.

Because the safety lock mechanism 302 is a separate mechanism that is independently operated, the safety lock mechanism 302 is limited to any specific construction of the frame locking mechanism. For example, the child stroller apparatus 100 can include the safety lock mechanism 302 in combination with any of the frame locking mechanism 156 and 256 described previously. According some variant embodiments, the child stroller apparatus 100 may omit the frame locking mechanism 156 and 256 and can be locked in the unfolded state with the safety lock mechanism 302, i.e., the safety lock mechanism 302 can serve as a frame locking mechanism.

Figure 34:
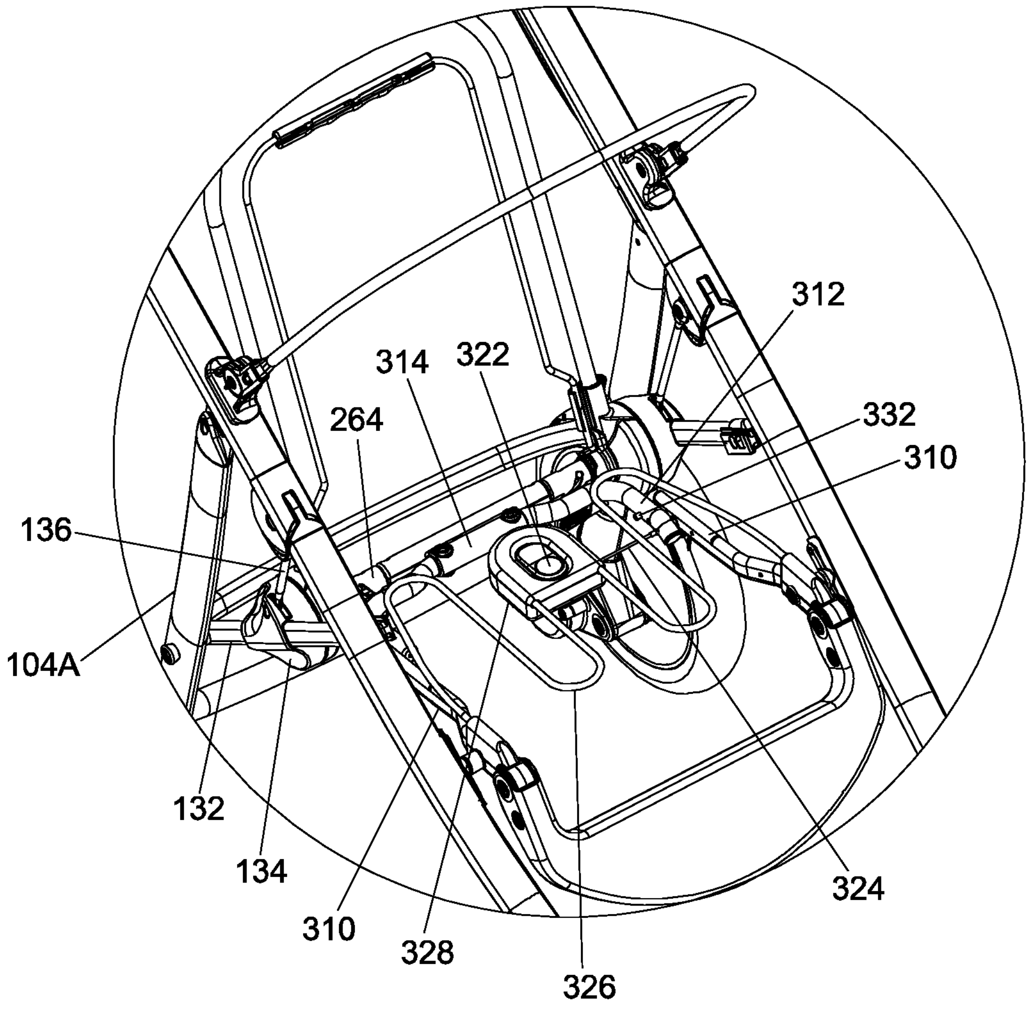
FIG. 34 is an enlarged view illustrating a portion of the child stroller apparatus shown in FIG. 31.
Figure 35:
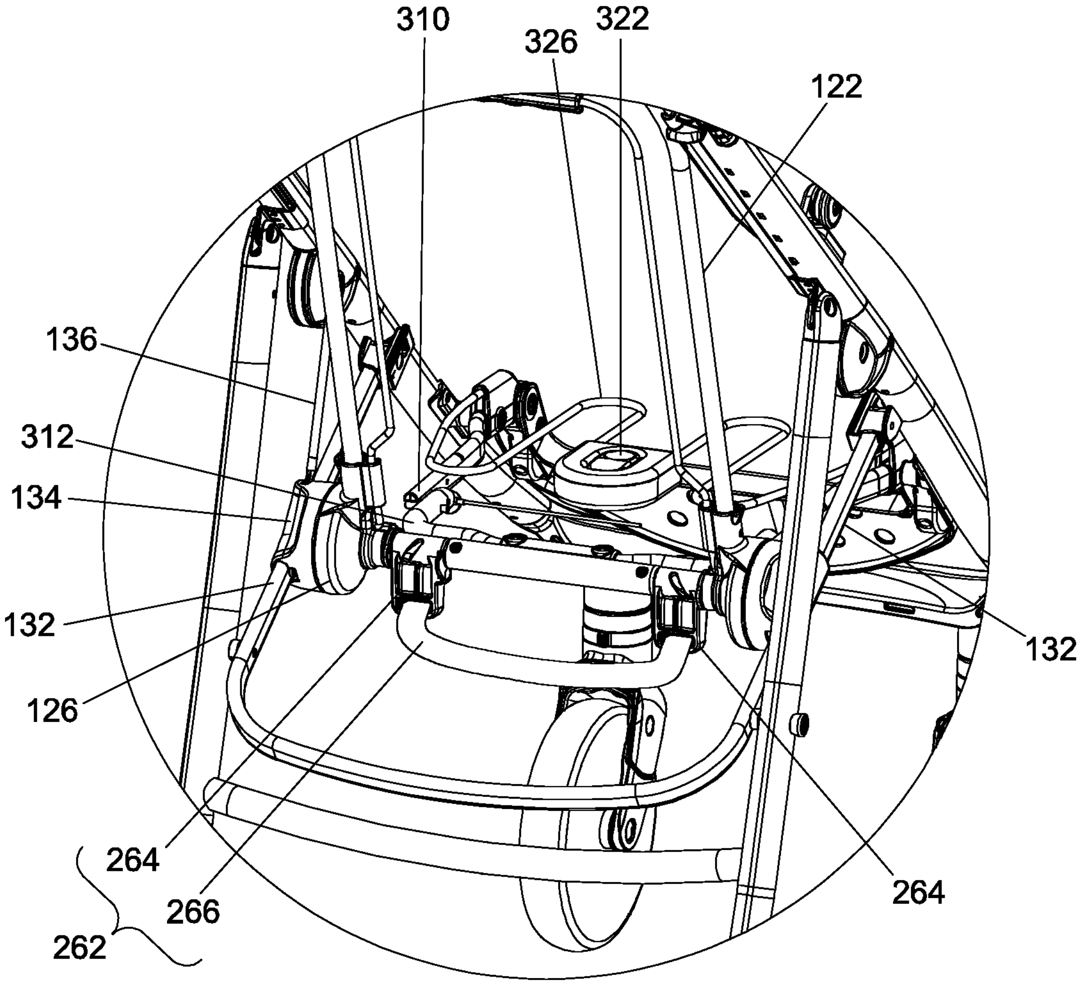
FIG. 35 is an enlarged view taken under a different angle of view illustrating a portion of the child stroller apparatus shown in FIG. 31.
Figure 36:
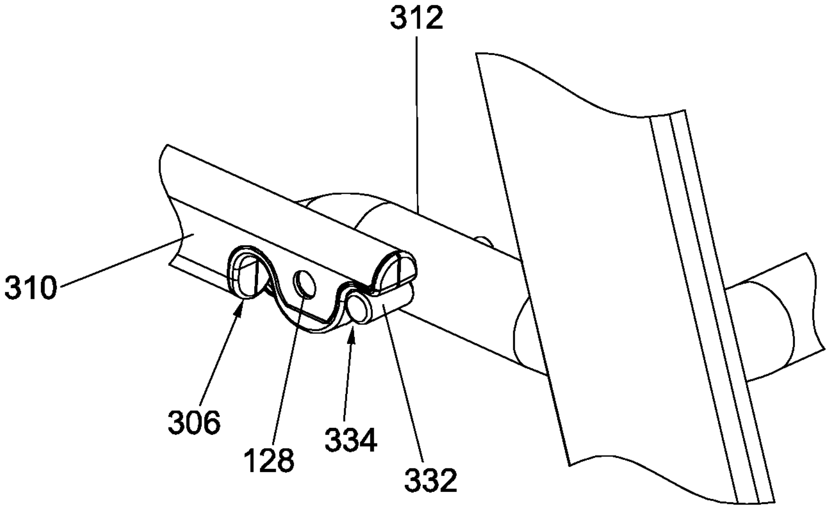
FIG. 36 is a perspective view illustrating a portion of a seat assembly in the child stroller apparatus of FIG. 31.

Referring to FIGS. 34 and 36, a stop 332 may further be provided to prevent excessive rotation of the seat portions 118 and 120 in the unfolding direction. The stop 332 and the lock 304 may be disposed at two opposite sides of the articulation 128. According to an example of construction, the stop 332 may be fixedly connected to the bar segment 312. The stop 332 can abut against an underside of the bar segment 310 when the seat portions 118 and 120 are in the unfolded state, and can be displaced away from the bar segment 310 when the seat portions 118 and 120 are folded. For facilitating the abutment of the stop 332, the bar segment 310 can have a recessed portion 334 facing downward, and the stop 332 can engage with the recessed portion 334 when the seat portions 118 and 120 are unfolded. It will be appreciated that the stop 332 and the recessed portion 334 may be interchanged in position, i.e., the stop 332 may be disposed on the bar segment 310 and the recessed portion 334 may be provided on the bar segment 312.

Advantages of the child stroller apparatus described herein include the ability to smoothly fold and unfold the stroller frame in a safe way, and allow convenient folding with a single hand.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

The invention claimed is:

1. A child stroller apparatus comprising:

a first leg frame and a second leg frame, the first leg frame including a first side segment, the second leg frame including a second side segment;

a handle frame including a third side segment respectively connected pivotally to the first side segment and the second side segment, wherein the third side segment is pivotally connected to the first side segment via an articulation;

a seat assembly coupled to the first side segment; and a linkage including a support bar, a slider and a frame link, wherein the support bar is respectively connected pivotally to the first side segment and the second side segment, the slider is coupled to the seat assembly and is slidably connected to the support bar, and the frame link is pivotally connected to the slider, the slider sliding along the support bar during folding and unfolding of the child stroller apparatus.

2. The child stroller apparatus according to claim 1, wherein the slider slides toward a location where the support bar pivotally connects to the first side segment during folding of the child stroller apparatus, and slides toward a location where the support bar pivotally connects to the second side segment during unfolding of the child stroller apparatus.

3. The child stroller apparatus according to claim 1, wherein the frame link is respectively connected pivotally to the slider and the articulation.

4. The child stroller apparatus according to claim 1, further comprising a frame locking mechanism having a locking state and an unlocking state, wherein the frame locking mechanism locks the slider to the support bar in the locking state and allows sliding of the slider along the support bar in the unlocking state.

5. The child stroller apparatus according to claim 4, wherein the frame locking mechanism includes a latch that is at least partially received inside the slider, the latch being movable relative to the slider to engage with or disengage from the support bar, the latch being engaged with the support bar in the locking state and disengaged from the support bar in the unlocking state.

6. The child stroller apparatus according to claim 5, wherein the frame locking mechanism further includes a latch actuator connected to the latch, the latch actuator being operable to cause the latch to move relative to the slider for disengaging from the support bar.

7. The child stroller apparatus according to claim 5, wherein the seat assembly is pivotally connected to the slider about an axis so that the seat assembly is rotatable about the axis relative to the slider, and the latch is slidable along the axis relative to the slider for engaging with and disengaging from the support bar.

8. The child stroller apparatus according to claim 7, wherein the seat assembly is pivotally connected to the slider via a shaft extending along the axis, the shaft being carried with the slider, the latch being slidable along the shaft relative to the slider for engaging with and disengaging from the support bar.

9. The child stroller apparatus according to claim 8, wherein the frame locking mechanism further includes a latch actuator connected to the latch, the latch actuator having at least a portion configured to be rotatable about the axis, the latch actuator being operable to cause the latch to slide relative to the slider for disengaging from the support bar.

10. The child stroller apparatus according to claim 9, wherein the latch is slidably connected to the latch actuator and is rotatable along with the latch actuator about the axis, the latch being in sliding contact with an interacting surface of the slider, whereby a rotation of the latch actuator about the axis causes the latch to slide along the axis.

11. The child stroller apparatus according to claim 9, wherein the latch actuator includes the shaft and a handle fixedly connected to the shaft, the shaft being rotatable about the axis relative to the slider, the latch being slidable along a hollow interior of the shaft.

12. The child stroller apparatus according to claim 11, further comprising a safety lock mechanism including a releasing part and an impeding part connected to each other, the releasing part being assembled with the handle, the impeding part being movable through the shaft to engage with the latch to prevent the latch from switching from the locking state to the unlocking state, and the releasing part being operable to cause the impeding part to disengage from the latch so that the latch is allowed to switch from the locking state to the unlocking state.

13. The child stroller apparatus according to claim 9, wherein the latch actuator includes an operating part configured as a flexible strip, the operating part extending through the seat assembly from an underside thereof to an upper side thereof at a location forward of the axis.

14. The child stroller apparatus according to claim 13, wherein the latch is slidable along a hollow interior of the shaft, and the latch actuator further includes a driving part respectively connected to the latch and the operating part, the driving part being rotatable around the shaft for urging the latch to disengage from the support bar.

15. The child stroller apparatus according to claim 14, wherein the driving part has a guide slot, the latch has a pin, and the pin extends through a slot on the shaft and is slidably connected with the guide slot of the driving part.

16. A child stroller apparatus comprising:

a first leg frame and a second leg frame, the first leg frame including a first side segment, the second leg frame including a second side segment;

a handle frame including a third side segment respectively connected pivotally to the first side segment and the second side segment, wherein the third side segment is pivotally connected to the first side segment via an articulation;

a seat assembly coupled to the first side segment; and a linkage including a support bar, a slider and a frame link, wherein the support bar is respectively connected pivotally to the first side segment and the second side segment, the slider is coupled to the seat assembly and is slidably connected to the support bar, and the frame link is pivotally connected to the slider, the slider sliding along the support bar during folding and unfolding of the child stroller apparatus;

wherein the seat assembly includes a backrest frame, and a first seat portion and a second seat portion pivotally connected to each other, the first seat portion being pivotally connected to the first side segment, and the backrest frame, the second seat portion and the slider being pivotally connected to one another about a same axis.

17. The child stroller apparatus according to claim 16, wherein:

the slider has a slide coupling portion and a first pivot coupling portion fixedly connected to each other, the backrest frame is fixedly connected to a second pivot coupling portion, the support bar being slidably connected to the slider through the slide coupling portion, and the first pivot coupling portion being pivotally connected to the second pivot coupling portion so that the backrest frame is rotatable about the axis relative to the slider;

the seat assembly is pivotally connected about a shaft that is carried with the slider, extends along the axis and passes through the second pivot coupling portion; and the child stroller apparatus further comprises a backrest locking mechanism configured to lock the backrest frame to the slider, wherein the backrest locking mechanism includes a locking part slidably connected to the shaft so that the locking part is slidable along the shaft between a locking position and an unlocking position, the locking part being engaged with the first pivot coupling portion and the second pivot coupling portion in the locking position for preventing the backrest frame from rotating relative to the slider, and the locking part being disengaged from one of the first pivot coupling portion and the second pivot coupling portion in the unlocking position for rotation of the backrest frame relative to the slider.

18. The child stroller apparatus according to claim 17, wherein the shaft has an abutting portion in sliding contact with the locking part, the shaft and the abutting portion being concurrently rotatable about the axis to urge the locking part to slide toward the unlocking position.

19. The child stroller apparatus according to claim 16, wherein:

the slider has a slide coupling portion and a first pivot coupling portion fixedly connected to each other, the backrest frame is fixedly connected to a second pivot coupling portion, the support bar being slidably connected to the slider through the slide coupling portion, and the first pivot coupling portion being pivotally connected to the second pivot coupling portion so that the backrest frame is rotatable about the axis relative to the slider;

the seat assembly is pivotally connected about a shaft that is carried with the slider, extends along the axis and passes through the second pivot coupling portion; and the child stroller apparatus further comprises a frame locking mechanism having a locking state that locks the slider to the support bar and an unlocking state that allows sliding of the slider along the support bar, wherein the frame locking mechanism includes a latch that is at least partially received inside the slider and is movable relative to the shaft, and a latch actuator connected to the latch, the latch being engaged with the support bar in the locking state and disengaged from the support bar in the unlocking state, the latch actuator being operable to cause the latch to move for disengaging from the support bar, the latch actuator having at least a portion configured to be rotatable about the axis;

wherein the latch actuator includes a driving part connected to the latch, the driving part being rotatable around the shaft for urging the latch to disengage from the support bar.

20. The child stroller apparatus according to claim 16, wherein the second seat portion is pivotally connected to the slider, and relative rotation between the first seat portion and the second seat portion is linked to sliding of the slider along the support bar.

* * * * *